(12) United States Patent
Isono et al.

(10) Patent No.: US 9,409,809 B2
(45) Date of Patent: *Aug. 9, 2016

(54) METHOD FOR MANUFACTURING GLASS BLANK FOR MAGNETIC DISK, METHOD FOR MANUFACTURING GLASS SUBSTRATE FOR MAGNETIC DISK, GLASS BLANK FOR MAGNETIC DISK

(75) Inventors: Hideki Isono, Kofu (JP); Hidekazu Tanino, Akishima (JP); Akira Murakami, Akiruno (JP); Takashi Sato, Inagi (JP); Masamune Sato, Kodaira (JP)

(73) Assignee: HOYA CORPORATION, Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 13/982,838

(22) PCT Filed: Apr. 27, 2012

(86) PCT No.: PCT/JP2012/002941
§ 371 (c)(1),
(2), (4) Date: Nov. 20, 2013

(87) PCT Pub. No.: WO2012/147372
PCT Pub. Date: Nov. 1, 2012

(65) Prior Publication Data
US 2014/0065446 A1 Mar. 6, 2014

(30) Foreign Application Priority Data

Apr. 27, 2011 (JP) ................................ 2011-100211
May 23, 2011 (JP) ................................ 2011-114454
Jun. 7, 2011 (JP) ................................ 2011-127751

(51) Int. Cl.
G11B 5/84 (2006.01)
C03B 11/12 (2006.01)

(52) U.S. Cl.
CPC ............... *C03B 11/12* (2013.01); *C03B 11/088* (2013.01); *C03B 11/122* (2013.01);
(Continued)

(58) Field of Classification Search
None
See application file for complete search history.

(56) References Cited

U.S. PATENT DOCUMENTS 4,372,774 A * 2/1983 Cross ........................ B01J 8/46
165/104.16
8,567,216 B2 * 10/2013 Isono .................... C03B 11/088
65/61

(Continued)

FOREIGN PATENT DOCUMENTS

CN 1418837 A 5/2003
CN 1618745 A 5/2005

(Continued)

OTHER PUBLICATIONS

English Translation of JP 01-133948 A (published 1989).*

(Continued)

*Primary Examiner* — Kevin Bernatz
(74) *Attorney, Agent, or Firm* — Global IP Counselors, LLP

(57) ABSTRACT

A method for manufacturing a glass blank for magnetic disk and a method for manufacturing a glass substrate for magnetic disk are provided which are capable of producing a glass blank for magnetic disk having a good surface waviness by press forming. The method includes a forming process of press-forming a lump of molten glass using a pair of dies, wherein in the forming process, press forming is performed using thermally equalizing means for reducing a difference in temperature in the press forming surface of the die during pressing of the molten glass.

29 Claims, 13 Drawing Sheets

(51) Int. Cl.
*C03B 11/08* (2006.01)
*G11B 5/82* (2006.01)

(52) U.S. Cl.
CPC ............... *C03B 11/125* (2013.01); *G11B 5/82* (2013.01); *G11B 5/8404* (2013.01); *C03B 2215/07* (2013.01); *C03B 2215/70* (2013.01)

(56) References Cited

U.S. PATENT DOCUMENTS

| | | | | |
|---|---|---|---|---|
| 8,733,129 B2* | 5/2014 | Eda | ...................... | G11B 5/8404 428/846.9 |
| 8,800,320 B2* | 8/2014 | Isono | .................... | C03B 11/084 65/90 |
| 8,806,893 B2* | 8/2014 | Isono | ...................... | C03C 19/00 65/66 |
| 8,806,895 B2* | 8/2014 | Eda | ........................... | C03B 7/11 65/127 |
| 8,844,320 B2* | 9/2014 | Isono | .................... | C03B 11/084 428/846.9 |
| 8,973,404 B2* | 3/2015 | Eda | .......................... | C03B 7/10 65/127 |
| 9,085,479 B2* | 7/2015 | Eda | ...................... | G11B 5/8404 |
| 9,153,269 B2* | 10/2015 | Isono | .................... | G11B 5/8404 |
| 9,242,888 B2* | 1/2016 | Isono | .................... | G11B 5/8404 |
| 2002/0009602 A1* | 1/2002 | Kitayama | ............. | C03B 11/088 428/432 |
| 2003/0164004 A1* | 9/2003 | Hirota | .................. | C03B 11/125 65/29.16 |
| 2004/0134232 A1 | 7/2004 | Kainuma et al. | | |
| 2005/0272589 A1* | 12/2005 | Shimizu | ................. | C03C 3/068 501/54 |
| 2010/0107695 A1* | 5/2010 | Nozaki | ................. | C03B 11/088 65/60.1 |
| 2013/0316194 A1* | 11/2013 | Isono | .................... | G11B 5/8404 428/846.9 |
| 2014/0033768 A1* | 2/2014 | Isono | .................... | G11B 5/8404 65/90 |
| 2014/0050912 A1* | 2/2014 | Isono | .................... | C03C 21/002 428/220 |
| 2014/0060117 A1* | 3/2014 | Isono | .................... | G11B 5/8404 65/97 |

FOREIGN PATENT DOCUMENTS

| | | | |
|---|---|---|---|
| CN | 101147193 A | | 3/2008 |
| JP | 01133948 A | * | 5/1989 |
| JP | 2001-172029 A | | 6/2001 |
| JP | 2004-196651 A | | 7/2004 |
| JP | 2005-263574 A | | 9/2005 |
| JP | 2008-174402 A | | 7/2008 |
| JP | 2009-269762 A | | 11/2009 |
| JP | 2010-105874 A | | 5/2010 |
| JP | 2011-040122 A | | 2/2011 |

OTHER PUBLICATIONS

Office Action in the corresponding Chinese Patent Application No. 201280020198.9 dated May 6, 2015.
International Search Report of corresponding International Application No. PCT/JP2012/002941, dated on Jul. 24, 2012.

* cited by examiner

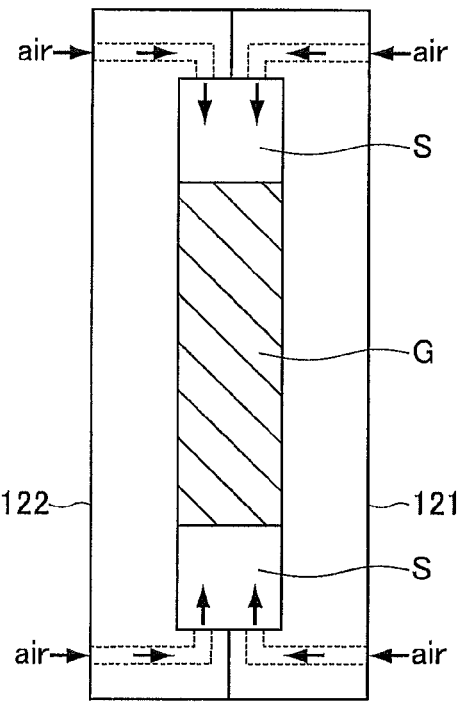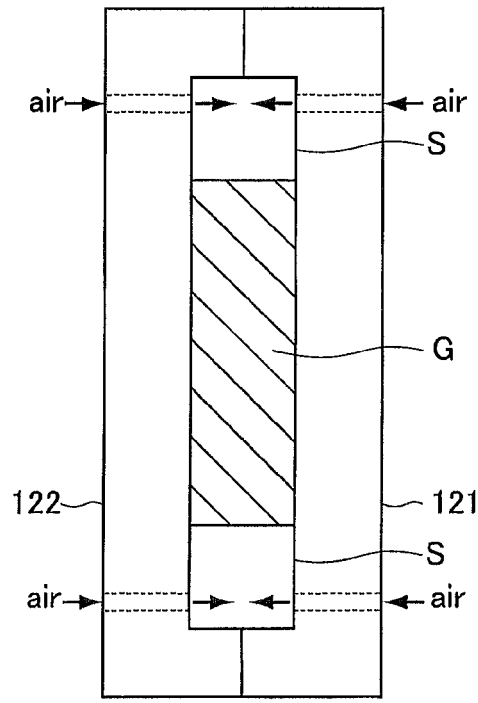
FIG.13

METHOD FOR MANUFACTURING GLASS BLANK FOR MAGNETIC DISK, METHOD FOR MANUFACTURING GLASS SUBSTRATE FOR MAGNETIC DISK, GLASS BLANK FOR MAGNETIC DISK

CROSS-REFERENCE TO RELATED APPLICATIONS

This U.S. National stage application claims priority under 35 U.S.C. §119(a) to Japanese Patent Application No. 2011-100211, filed in Japan on Apr. 27, 2011, to Japanese Patent Application No. 2011-114454, filed in Japan on May 23, 2011, and to Japanese Patent Application No. 2011-127751, filed in Japan on Jun. 7, 2011, the entire contents of Japanese Patent Application Nos. 2011-100211, 2011-114454 and 2011-127751 are hereby incorporated herein by reference.

BACKGROUND

1. Field of the Invention

The present invention relates to a method for manufacturing a glass blank for magnetic disk, and a method for manufacturing a glass substrate for magnetic disk.

2. Background Information

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 2009-269762, FIG. 4, etc.). The vertical direct press method requires a work gripping device for gripping a glass blank obtained after pressing and taking out the glass blank from a die.

SUMMARY

However, the known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Thereafter, the upper part comes into contact with the upper die, and is thereby rapidly cooled to be solidified. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

Further, in the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release material remains attached on the glass blank, the surface roughness cannot be decreased. Preferably the temperatures of the upper die and the lower die are made identical wherever possible for preparing a glass blank having good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires removal processes by polishing/grinding and so on in subsequent processes in order to improve the flatness and remove the mold release material sticking to the surface of the glass blank.

Further, the vertical direct press method requires a work gripping device for gripping a glass blank obtained after pressing and taking out the glass blank from a die as described above, but when the glass blank on the die is gripped after pressing, the work gripping device may come into contact with the glass blank or die surface to damage the glass blank or die surface.

An object of the invention of the present invention is to provide a method for manufacturing a glass blank for magnetic disk, by which a glass blank for magnetic disk having good flatness is obtained by press forming, a method for manufacturing a glass substrate for magnetic disk, and a glass blank for magnetic disc.

The other object of the invention of the present invention is to provide a method for manufacturing a glass blank for magnetic disk, by which a glass blank for magnetic disk having good flatness is obtained by press forming and in which a glass blank or a die is not damaged when the blank is taken out from the die, and a method for manufacturing a glass substrate for magnetic disk.

Solution to Problem

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming die) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

When a difference in temperature at a position where a pair of dies face each other at the time of press-forming the molten glass is small, the flatness of the glass blank produced can be decreased as compared to the case where the above-mentioned difference is large. This is because when the difference in temperature between a pair of dies is smaller, a thermal balance is easily achieved when the molten glass at a high temperature comes into contact the inner circumferential surface of the die and is thereby rapidly cooled, so that deterioration of the flatness of the glass blank that may be caused by a very small difference in degree of heat deformation between a pair dies at the cooling stage can be further suppressed. There is a correlation between a difference in temperature at a position where a pair of dies face each other at the time of press-forming the molten glass and flatness of the glass blank obtained after press forming. If this correlation is known, a maximum value of a difference in temperature (absolute value) between a pair of dies for achieving flatness required for the glass substrate for magnetic disk can be determined. Thus, when a difference in temperature between a pair of dies is controlled so as not to exceed its maximum value, flatness required for the glass substrate for magnetic disk can be achieved.

From the viewpoint described above, the first aspect of the present invention may be a method for manufacturing a glass blank for magnetic disk which includes a forming process of press-forming a lump of molten glass using a pair of dies. The method includes: obtaining a correlation between a difference in temperature of a pair of dies in press-forming the molten glass and flatness of the glass blank obtained after press forming, the difference being measured at positions of the pair of dies facing each other; determining a difference in temperature of the pair of dies based on the correlation, the difference enabling flatness required for the glass blank; and performing the forming process so that a difference in temperature of the pair of dies is within the determined difference in temperature.

In the method for manufacturing a glass blank for magnetic disk, preferably the flatness required for the glass blank may be equal to flatness of a magnetic disk. The flatness of the magnetic disk is determined to prevent a head from touching the magnetic disk when the magnetic disk is mounted in a hard disk device.

In the method for manufacturing a glass blank for magnetic disk, preferably, in the forming process, press forming may be performed so that the temperature of portions of the pair of dies, which contact the molten glass, is substantially the same.

In the method for manufacturing a glass blank for magnetic disk, the temperature of the pair of dies may be kept lower than a glass transition point (Tg) of the molten glass during a period of time until the glass blank is separated from the die after beginning to contact the die.

In the method for manufacturing a glass blank for magnetic disk, press forming may be performed without attaching a mold release material to the die.

In the method for manufacturing a glass blank for magnetic disk, a thermal expansion coefficient at 100° C. to 300° C. of a glass blank obtained after formation may be in a range of $30 \times 10^{-7}$ to $100 \times 10^{-7} (K^{-1})$.

In the method for manufacturing a glass blank for magnetic disk, the lump of molten glass may be press-formed in the forming process so that flatness of the glass blank is 8 μm or less.

The second aspect of the present invention may be a method for manufacturing a glass blank for magnetic disk, which includes a forming process of press-forming a lump of molten glass using a pair of dies. In the forming process, the lump of molten glass is press-formed so that a difference in temperature of the pair of dies is 10° C. or less, the difference being measured at positions of the pair of dies facing each other.

The third aspect of the present invention may be a method for manufacturing a glass blank for magnetic disk, which includes a forming process of press-forming a lump of molten glass using a pair of dies. In the forming process, the lump of molten glass is press-formed so that flatness of the glass blank is 8 μm or less.

A method for manufacturing a glass substrate for magnetic disk according to the present invention may include a polishing process for polishing a glass blank with a machining allowance of 50 μm or less to manufacture a glass substrate for magnetic disk, the glass blank being manufactured with the method for manufacturing a glass blank for magnetic disk according to the first to the third aspect.

In a method for manufacturing a glass substrate for magnetic disk according to the present invention, a glass substrate for magnetic disk may be manufactured using a glass blank for magnetic disk, the glass blank being obtained by the method for manufacturing a glass blank for magnetic disk according to the first to the third aspect.

Meanwhile, in the horizontal direct press method, press forming is performed using a pair of dies arranged so as to face each other in a direction orthogonal to the falling direction of the molten glass lump, and therefore after the dies are opened, the press-formed glass blank falls down vertically due to its gravity in most cases. Thus, a work gripping device for taking out the glass blank from the die is not required, and therefore unlike the vertical direct press method, the glass blank or die is not damaged when the glass blank is taken out from the die.

However, the present inventors performed a large number of press forming operations using the devised horizontal direct press method described above, and resultantly found the fact that even after dies are opened, the glass blank is stuck to one of a pair of dies arranged in a horizontal direction. Since the sticking force of the glass blank to the die is not strong, a method was contemplated in which after the die is opened, air is discharged from the interior of the die toward the press forming surface (i.e. in the horizontal direction), and the glass blank is detached from the die by means of the discharge force. This method was capable of detaching the glass blank from the die, but had the problem that the flatness of the glass blank is deteriorated when the glass blank is mass-produced. The reason for this is as follows. That is, which of a pair of dies the glass blank is stuck to is unknown unless the dies are opened. Thus, discharge of air in the horizontal direction must be performed for both the dies. Consequently, the degree of cooling of the die by discharge of air varies between the die to which the glass blank is stuck and the die to which the glass blank is not stuck, so that the next molten glass lump is pressed while there is a large difference in temperature between the dies. When press forming is performed while there is a large difference in temperature between the dies, the cooling process varies between one surface and the other surface of the glass blank which is press-formed, so that a deformation is generated, resulting in deterioration of the flatness.

As described above, when a factor of increasing a difference in temperature between dies exists between press forming of a molten glass and press forming of the next molten glass, the flatness of a glass blank prepared based on the next molten glass is deteriorated. The present inventors devised, on the basis of the above-described findings, a method in which the flatness of a glass blank is not deteriorated even when a factor of increasing a difference in temperature between dies exists between press forming of a molten glass and press forming of the next molten glass. This method includes reducing a difference in temperature between portions of a pair of dies, which contact a molten glass, by bringing the aforementioned portions and a thermally equalizing material into surface contact with each other over a period of time until a new molten glass is caused to fall down for press forming after a glass blank stuck to one of the dies is taken out from the die after the dies are opened. According to this method, even when treatment which causes a factor of increasing a difference in temperature between dies, such as, for example, treatment for detaching a glass blank from a die as described above, the temperatures of a pair of dies can be equalized in a short time at the time when the next molten glass is press-formed, so that glass blanks having a good flatness can be continuously obtained when molten glasses are continuously press-formed (i.e. in the mass production process).

From the viewpoint described above, the fourth aspect of the present invention may be a method for manufacturing a glass blank for magnetic disk, which includes a forming process of forming a plate-shaped glass blank by press-forming a falling molten glass in a direction orthogonal to the falling direction using a pair of dies, wherein the forming process includes a thermally equalizing process for reducing a difference in temperature of the pair of dies during a period of time until a new molten glass is press-formed after the dies are opened.

In the method for manufacturing a glass blank for magnetic disk, the thermally equalizing process may be a process of bringing a thermally equalizing material into contact with at least one of the pair of dies.

In the method for manufacturing a glass blank for magnetic disk, in the forming process, preferably press forming may be performed so that the temperature of portions of the pair of dies, which contact the molten glass, is substantially the same between the pair of dies.

In the method for manufacturing a glass blank for magnetic disk, the temperature of the pair of dies may be kept lower than a glass transition point (Tg) of the molten glass during a period of time until the glass blank is separated from the die after beginning to contact the die.

In the method for manufacturing a glass blank for magnetic disk, press forming may be performed without attaching a mold release material to the die.

A method for manufacturing a glass substrate for magnetic disk according to the present invention may include a polishing process for polishing a glass blank with a machining allowance of 50 μm or less to manufacture a glass substrate for magnetic disk, the glass blank being manufactured with the method for manufacturing a glass blank for magnetic disk according to the fourth aspect.

In a method for manufacturing a glass substrate for magnetic disk according to the present invention, a glass substrate for magnetic disk may be manufactured using a glass blank for magnetic disk, the glass blank being obtained with the method for manufacturing a glass blank for magnetic disk according to the fourth aspect.

Further, base of the findings described above, the present inventors devised a method in which a difference in temperature between dies is not increased when a glass blank is detached from one of a pair of dies. Even if a glass blank is attached to one of a pair of dies after press forming, a difference in temperature between dies is not increased at the time of press-forming the next molten glass when the glass blank is detached using the method in which a difference in temperature between dies. Therefore, glass blanks having good flatness can be continuously obtained when the molten glass is continuously press-formed (i.e. in the mass production process).

From the viewpoint described above, the fifth aspect of the present invention may be a method for manufacturing a glass blank for magnetic disk, which includes: performing a forming process of forming a plate-shaped glass blank by press-forming a falling molten glass in a direction orthogonal to the falling direction using a pair of dies; performing, after the forming process, a detachment process of detaching from the die the glass blank attached to the die is performed without causing a difference in temperature of the pair of dies; and performing, after the detaching process, the forming process by press-forming the next molten glass.

In one form of the method for manufacturing a glass blank for magnetic disk, in the detachment process, at least a part of the outer circumferential portion of the glass blank may be cooled while both the dies and the glass blank are in contact with each other.

In one form of the method for manufacturing a glass blank for magnetic disk, in the detachment process, at least a part of the outer circumferential edge portion of the glass blank may be cooled by supplying a gas to the glass blank.

In one form of the method for manufacturing a glass blank for magnetic disk, the gas may be supplied immediately before or concurrent with time at which the pair of dies having been closed starts to open.

In the method for manufacturing a glass blank for magnetic disk, preferably, in the forming process, press forming may be performed so that the temperature of portions of the pair of dies, which contact the molten glass, is substantially the same.

In the method for manufacturing a glass blank for magnetic disk, the temperature of the pair of dies may be kept lower than a glass transition point (Tg) of the molten glass during a period of time until the glass blank is separated from the die after beginning to contact the die.

In the method for manufacturing a glass blank for magnetic disk, press forming may be performed without attaching a mold release material to the die.

In the method for manufacturing a glass blank for magnetic disk, surface roughness (Ra) of each of the pair of dies may be 0.1 μm or less.

The sixth aspect of the present invention may be a method for manufacturing a glass blank for magnetic disk, which includes a forming process of forming a plate-shaped glass blank by press-forming a falling molten glass in a direction orthogonal to the falling direction using a pair of dies, wherein each of the pair of dies includes a passage for introducing a gas to a space formed by closing of the pair of dies, and in the forming process, the gas is supplied to the space through the passage of each die while the pair of dies are closed.

A method for manufacturing a glass substrate for magnetic disk according to the present invention may include a polishing process for polishing a glass blank with a machining allowance of 50 μm or less to manufacture a glass substrate for magnetic disk, the glass blank being manufactured with the method for manufacturing a glass blank for magnetic disk according to the fifth or the sixth aspect.

In a method for manufacturing a glass substrate for magnetic disk according to the present invention, a glass substrate for magnetic disk is manufactured using a glass blank for magnetic disk, the glass blank being obtained by the method for manufacturing a glass blank for magnetic disk according to the fifth or the sixth aspect.

BRIEF DESCRIPTION OF THE DRAWINGS

FIG. 13 is a view illustrating a method for supplying a gas to a space formed by closing of the die in press forming of the third embodiment.

DETAILED DESCRIPTION OF EMBODIMENTS

First Embodiment

A method for manufacturing a glass blank for magnetic disk and a method for manufacturing a glass substrate for magnetic disk in this embodiment will be described in detail below.

[Glass Substrate for Magnetic Disk]

Figure 1:
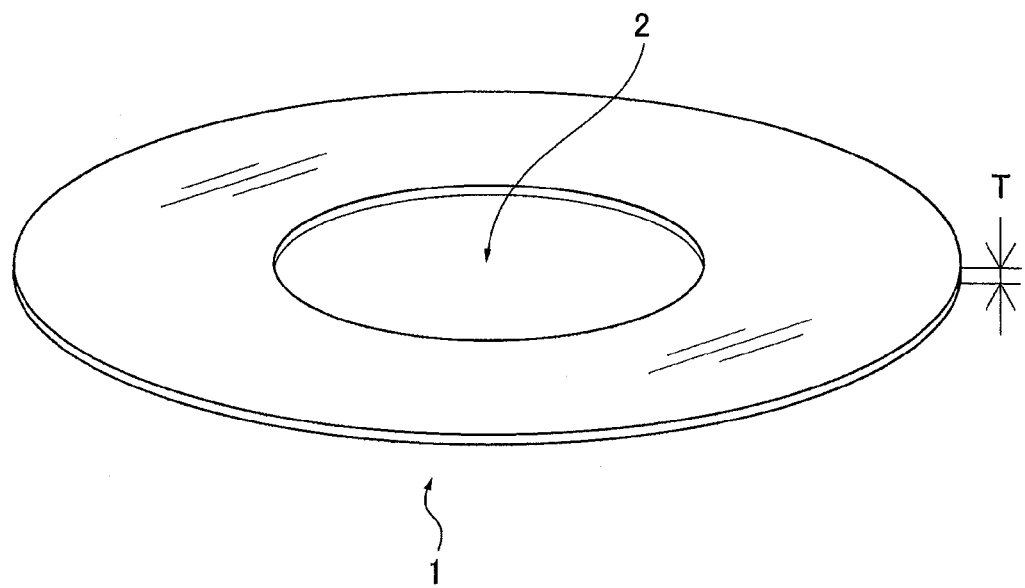
FIG. 1 is a perspective view illustrating an external shape of a glass substrate for magnetic disk of an embodiment.

As illustrated in FIG. 1, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Amorphous aluminosilicate glass, soda-lime glass, borosilicate glass or the like can be used as a material of the glass substrate for magnetic disk in this embodiment. Particularly, the amorphous aluminosilicate glass can be suitably used in that chemically strengthening can be performed, and a glass substrate for magnetic disk excellent in flatness of the principal face and strength of the substrate can be prepared. It is preferable if amorphous glass is prepared based on these glass materials because extremely small surface roughness is achieved. In view of the above, it is preferable from the both aspect of strength and reduction in surface roughness if amorphous aluminosilicate glass is prepared.

The composition of the glass substrate for magnetic disk of this embodiment is not limited, but the glass substrate of this embodiment is preferably made of amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion expressed in mol %.

The glass substrate according to the present embodiment may be amorphous aluminosilicate glass having the following composition.

Glass material including, as a glass composition expressed in mol %, 56 to 75% of $SiO_2$, 1 to 11% of $Al_2O_3$, more than 0% and 4% or less of $Li_2O$, 1% or more and less than 15% of $Na_2O$, and 0% or more and less than 3% of $K_2O$, and is substantially free of BaO;

a total content of alkali metal oxides selected from the group consisting of $Li_2°$, $Na_2O$, and $K_2O$ is in a range of 6 to 15%;

a molar ratio of a content of $Li_2O$ to a content of $Na_2O$ ($Li_2O/Na_2O$) is less than 0.50;

a molar ratio of a content of $K_2O$ to the total content of the alkali metal oxides $\{K_2O/(Li_2O+Na_2O+K_2O)\}$ is 0.13 or less;

a total content of alkaline-earth metal oxides selected from the group consisting of MgO, CaO, and SrO is in a range of 10 to 30%;

a total content of MgO and CaO is in a range of 10 to 30%;

a molar ratio of the total content of MgO and CaO to the total content of the alkaline-earth metal oxides $\{(MgO+CaO)/(MgO+CaO+SrO)\}$ is 0.86 or more;

a total content of the alkali metal oxides and the alkaline-earth metal oxides is in a range of 20 to 40%;

a molar ratio of a total content of MgO, CaO, and $Li_2O$ to the total content of the alkali metal oxides and the alkaline-earth metal oxides $\{(MgO+CaO+Li_2O)/(Li_2O+Na_2O+K_2O+MgO+CaO+SrO)\}$ is 0.50 or more;

a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

The glass substrate according to the present embodiment may be amorphous aluminosilicate glass having the following composition.

Glass material including, as a glass composition expressed in mol %, 50 to 75% of $SiO_2$, 0 to 5% of $Al_2O_3$, 0 to 3% of $Li_2O$, 0 to 5% of ZnO, 3 to 15% in total of $Na_2O$ and $K_2O$, 14 to 35% in total of MgO, CaO, SrO, and BaO and 2 to 9% in total of $ZrO_2$, $TiO_2$, $La_2O_3$, $Y_2O_3$, $Yb_2O_3$, $Ta_2O_5$, $Nb_2O_5$ and $HfO_2$, a molar ratio [(MgO+CaO)/(MgO+CaO+SrO+BaO)] is in a range of 0.8 to 1, and a molar ratio [$Al_2O_3$/(MgO+CaO)] is in a range of 0 to 0.30.

[Method for Manufacturing Glass Substrate for Magnetic Disk of Embodiment]

Figure 2:
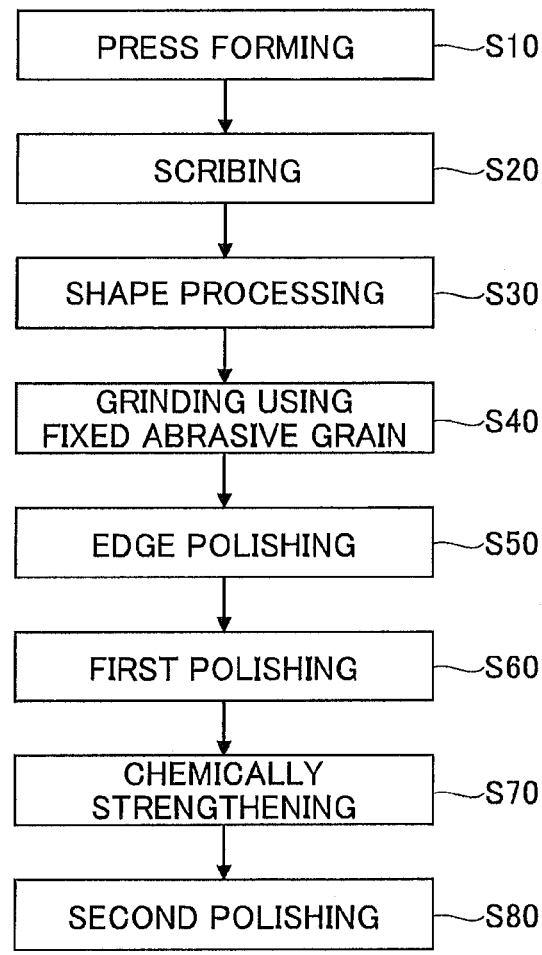
FIG. 2 is a view illustrating a flow of one embodiment of a method for manufacturing the glass substrate for magnetic disk of the embodiment.

Next, a flow of a method for manufacturing a glass substrate for magnetic disk will be described with reference to FIG. 2. FIG. 2 is a view illustrating a flow of one embodiment of a method for manufacturing a glass substrate for magnetic disk.

As illustrated in FIG. 2, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 3:
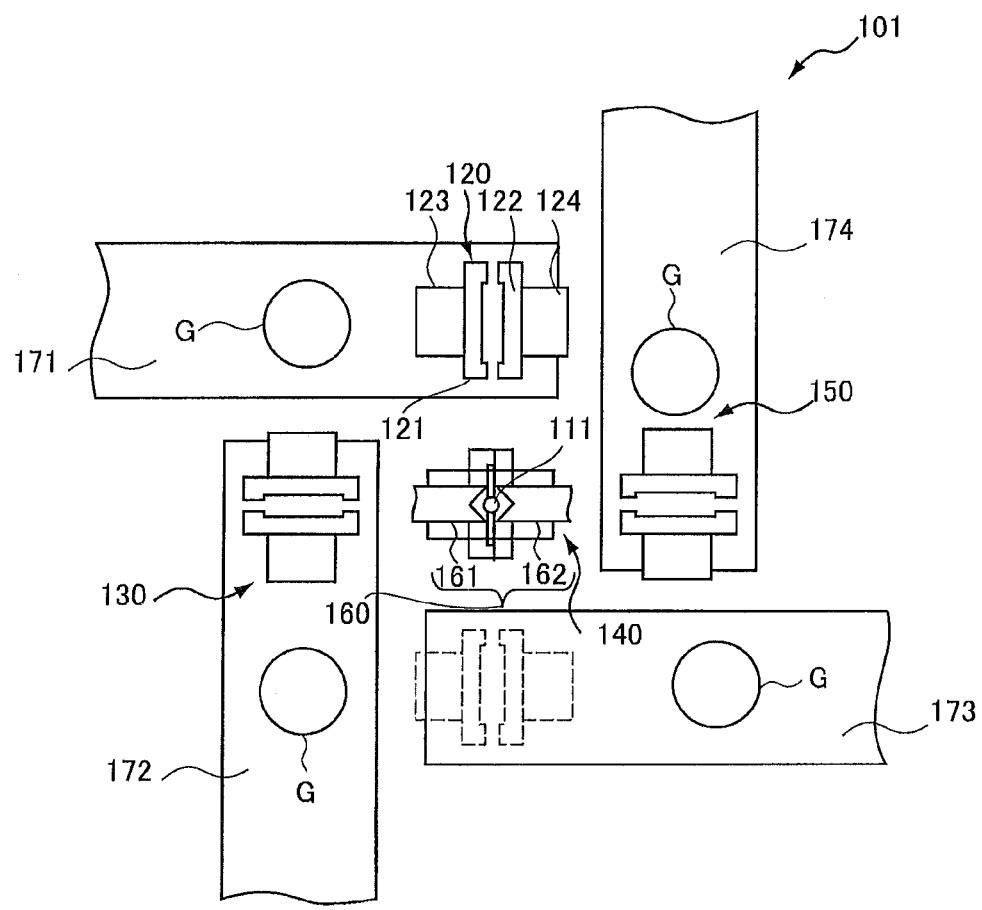
FIG. 3 is a plan view of an apparatus used in press forming of the embodiment.

First, the press forming process will be described with reference to FIG. 3. FIG. 3 is a plan view of an apparatus used in press forming. As illustrated in FIG. 3, an apparatus 101 includes four sets of press units 120, 130, 140 and 150, a cutting unit 160 and a cutting blade 165 (not illustrated in FIG. 2). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 4:
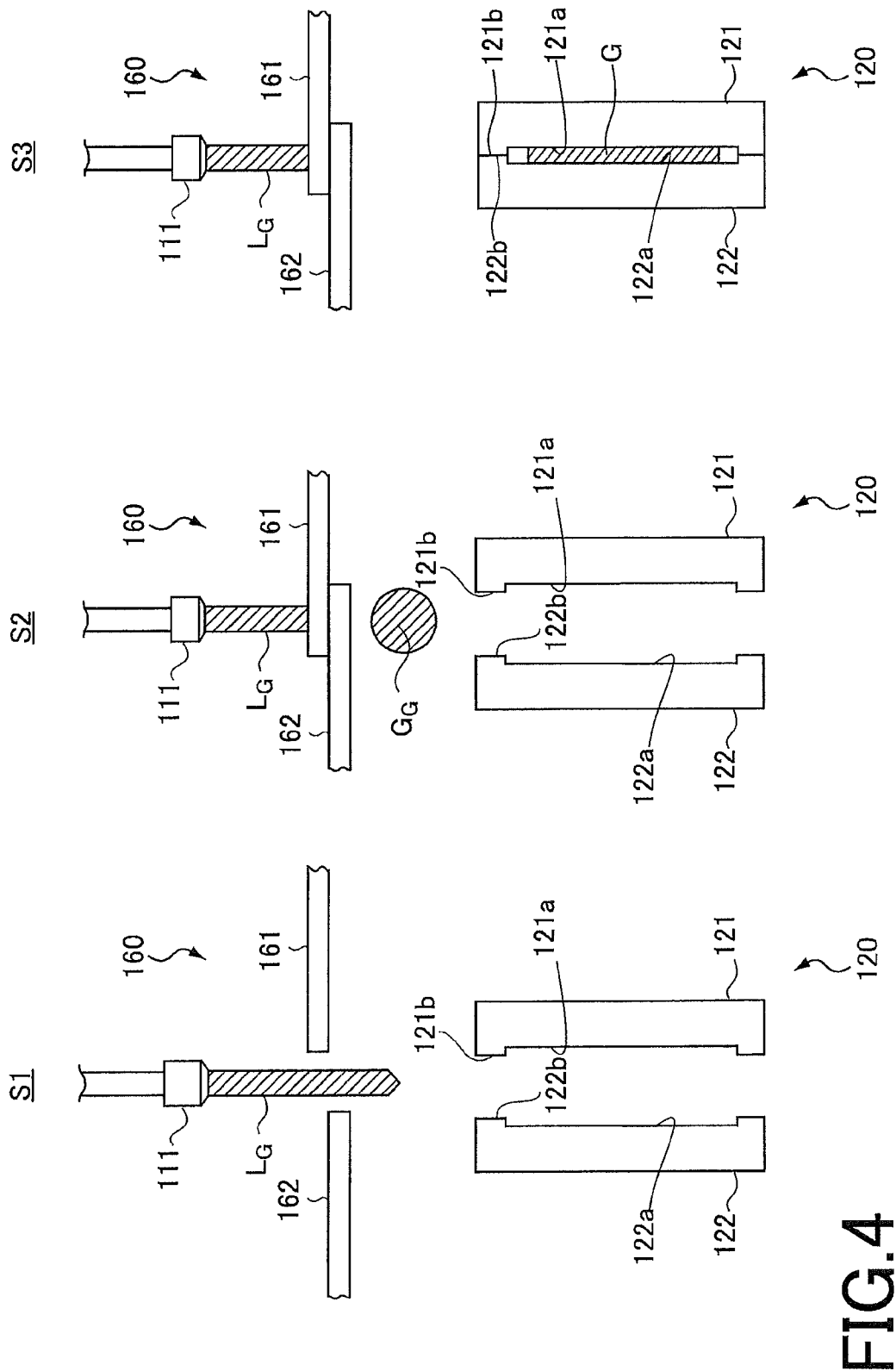
FIG. 4 is a view illustrating press forming of the embodiment.

Specifically, as illustrated in FIG. 4, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 3) is located immediately below the molten glass outflow port 111. The retreat position (positions in which the press units 120, 130, and 150 are drawn by solid lines and a position in which the press unit 140 is drawn by a broken line in FIG. 3) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 4 to S3 of FIG. 4 more specifically illustrates press forming performed by the apparatus 101. S1 of FIG. 4 is a view illustrating the state before the gob is made, S2 of FIG. 4 is a view illustrating the state in which the gob is made by the cutting unit 160, and S3 of FIG. 4 is a view illustrating the state in which the glass blank G is formed by pressing the gob.

As illustrated in S1 of FIG. 4, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 4). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in S3 of FIG. 4, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 4, the gob stretched by closed dies does not reach projections 121b and 122b of the dies.

A temperature control mechanism (not illustrated) is provided in each of the first die 121 and second die 122, and temperatures at the first die 121 and second die 122 is retained sufficiently lower than the glass transition temperature $T_G$ of the molten glass $L_G$. It is not necessary to attach a mold release material to the first die 121 and the second die 122 in the press forming process.

There is a correlation between a difference in temperature at a position where the inner circumferential surface 121a of the first die 121 and the inner circumferential surface 122a of the second die 122 face each other at the time of press-forming the gob $G_G$, and flatness of the glass blank obtained after press forming. That is, the flatness of the glass blank obtained after press forming becomes better as the difference in temperature at an opposed position between the inner circumferential surface 121a of the first die 121 and the inner circumferential surface 122a of the second die 122 decreases. This is because when the difference in temperature between a pair of dies is smaller, a thermal balance is achieved when the gob $G_G$ at a high temperature comes into contact the inner circumferential surface of the die and is thereby rapidly cooled, so that deterioration of the flatness of the glass blank that may be caused by a very small difference in degree of heat deformation between a pair dies at the cooling stage can be further suppressed.

Thus, if this correlation is known, a maximum value of a difference in temperature (absolute value) between a pair of dies (between the inner circumferential surface 121a of the first die 121 and the inner circumferential surface 122a of the second die 122) for achieving flatness required for the glass substrate for magnetic disk can be determined. Thus, when a difference in temperature between a pair of dies is controlled so as not to exceed its maximum value, flatness required for the glass substrate for magnetic disk can be achieved. For example, if the flatness required for the glass substrate for magnetic disk is 4 μm, press forming is performed while the difference in temperature between a pair of dies is kept at 10° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a). Time when the difference in temperature is measured is time when the gob starts to contact the first die 121 and the second die 122.

The difference in temperature may be determined based on the correlation to meet requirement of flatness for a glass substrate for a magnetic disk; however, the difference may be also determined from the following aspect.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of $30\times10^{-7}$ to $100\times10^{-7}(K^{-1})$, preferably in a range of $50\times10^{-7}$ to $100\times10^{-7}(K^{-1})$, even more preferably greater than $80\times10^{-7}$ $(K^{-1})$. The thermal expansion coefficient is a value calculated using the linear expansion coefficients of the glass substrate for magnetic disk at temperatures of 100° C. and 300° C. A thermal expansion coefficient of, for example, less than $30\times10^{-7}(K^{-1})$ or more than $100\times10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially the same. When temperature control is performed so that the temperatures become identical, for example, a difference in temperature is preferably 5° C. or less. The difference in temperature is more preferably 3° C. or less, especially preferably 1° C. or less.

In the present embodiment, press forming can be performed to any glass having a wide range of viscosity since horizontal pressing is applied, and glass having high viscosity is particularly preferable. This is because the glass is pressed in the middle of falling down in vertical direction, and circularity of the glass having relatively high viscosity becomes better. Specifically, the viscosity may be preferably 500 poises or more. Glass having the viscosity of 2000 poises or more is not preferable for the reason that the glass becomes difficult to be thinned.

A time until the gob $G_G$ is completely confined between the first die 121 and the second die 122 after the gob $G_G$ comes into contact with the inner circumferential surface 121a of the first die 121 or the inner circumferential surface 122a of the second die 122, is shorter than 0.1 second (approximately 0.06 second) in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121a and the inner circumferential surface 122a is substantially the same, and arithmetic mean roughness Ra of the glass blank G is preferably adjusted to 0.0005 to 0.05 µm, more preferable to 0.001 to 0.1 µm. Since surface property of the inner circumferential surface 121a and the inner circumferential surface 122a is transferred to the glass blank G, the surface roughness of the glass blank G is the same as that of the inner circumferential surfaces. It should be noted that, by performing press forming so that the surface roughness Ra of the obtained glass blank is 0.2 µm or less, polishing process can be performed without performing the later-described grinding process. If surface roughness Ra is more than 0.2 µm, there arises such a problem that when the glass blank is polished until the surface roughness becomes ultimately a sufficiently low level (e.g. 0.2 nm in Ra), the polishing time becomes too long because the polishing allowance is increased, so that productivity is reduced, and further the shape of the edge portion is deteriorated.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 3).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 4, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 5:
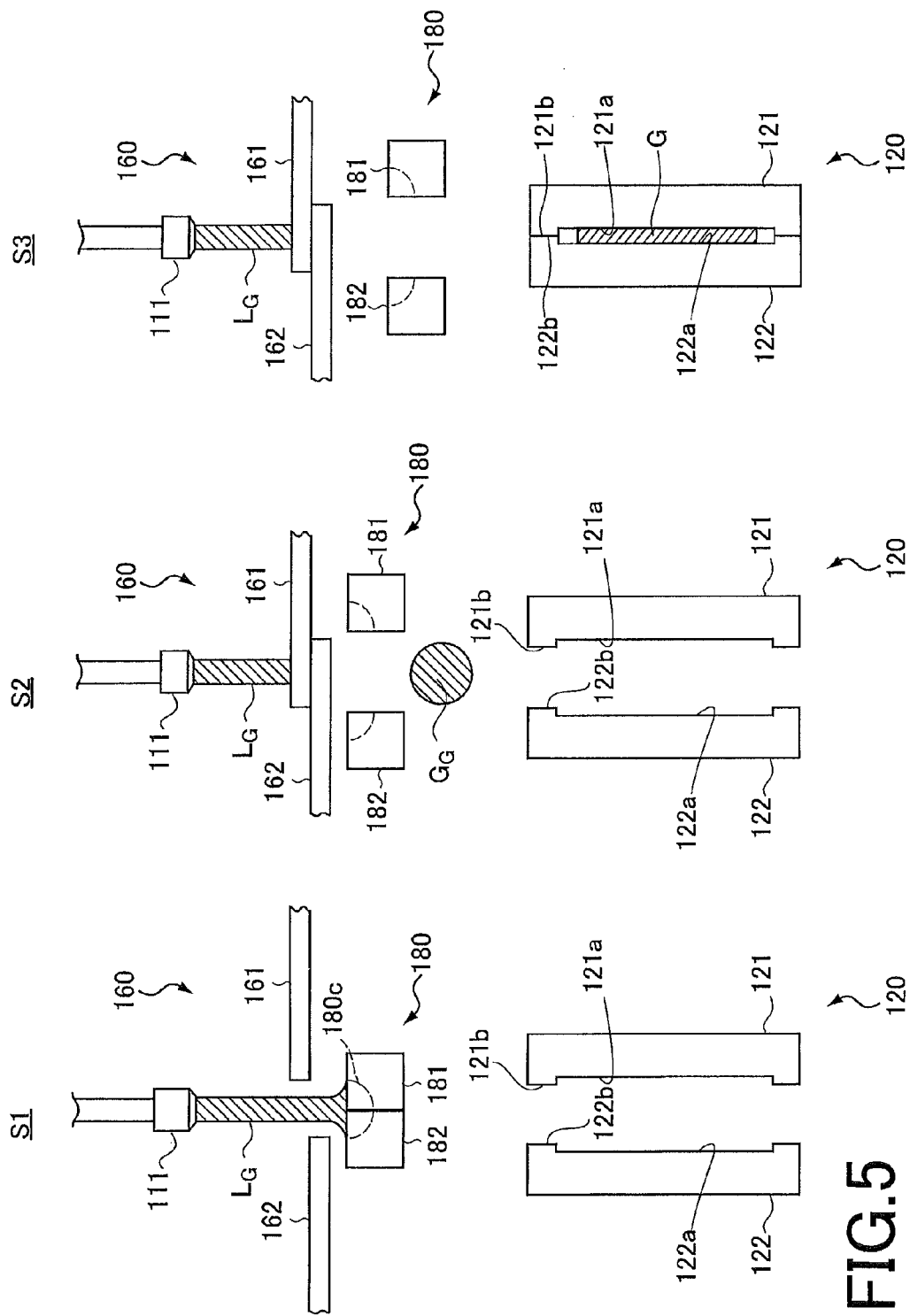
FIG. 5 is a view illustrating a modification of press forming of the embodiment using a gob forming die.

S1 of FIG. 5 to S3 of FIG. 5 are views illustrating a modification of the embodiment of FIG. 4. The gob forming die is used in the modification. S1 of FIG. 5 is a view illustrating the state before the gob is made, S2 of FIG. 5 is a view illustrating the state in which the gob $G_G$ is made by the cutting unit 160 and a gob forming die 180, and S3 of FIG. 5 is a view illustrating the state in which the press forming is performed to the gob $G_G$ to make the glass blank G.

As illustrated in S1 of FIG. 5, the path of the molten glass $L_G$ to the press unit 120 is closed by closing the blocks 181 and 182, and the lump of the molten glass $L_G$ cut with the cutting unit 160 is received by a recess 180C formed by the blocks 181 and 182. Then, as illustrated in S2 of FIG. 5, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 5, during the fall of the gob $G_G$, the spherical gob $G_G$ is sandwiched between the first die 121 and the second die 122 to perform the press forming, thereby preparing the disk-shaped glass blank G.

Figure 6:
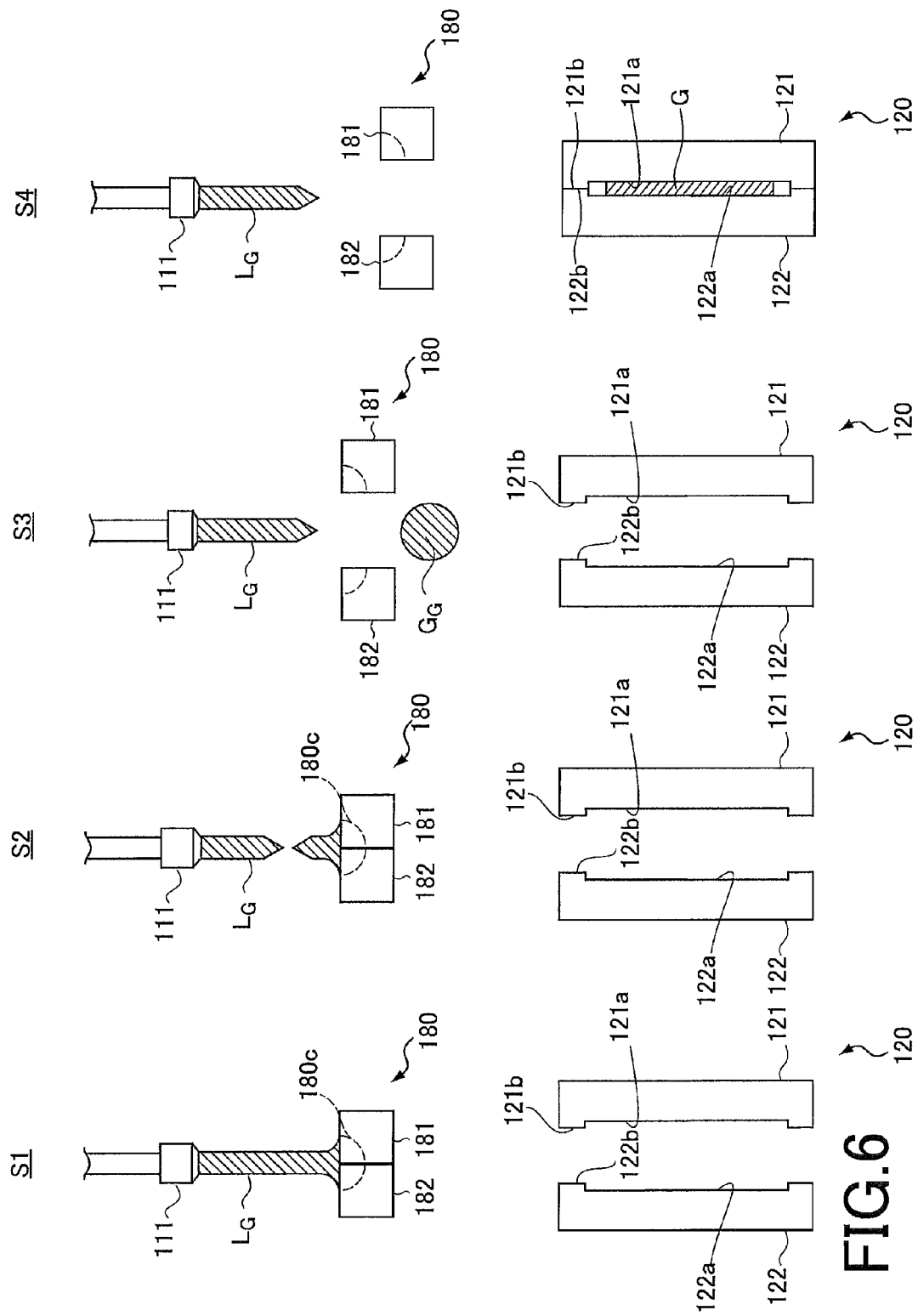
FIG. 6 is a view illustrating a modification of press forming of the embodiment in which a cutting unit is not used.

Alternatively, as illustrated in S1 of FIG. 6 to S4 of FIG. 6, in the apparatus 101, instead of using the cutting unit 160 illustrated in S1 of FIG. 5 to S3 of FIG. 5, a moving mechanism that moves the gob forming die 180 in an upstream direction or a downstream direction along the path of the molten glass $L_G$ may be used. S1 of FIG. 6 to S4 of FIG. 6 are views illustrating a modification in which the gob forming die 180 is used. S1 of FIG. 6 and S2 of FIG. 6 are views illustrating the state before the gob $G_G$ is made, S3 of FIG. 6 is a view illustrating the state in which the gob $G_G$ is made by the gob forming die 180, and S4 of FIG. 6 is a view illustrating the state in which the gob $G_G$ is subjected to press forming to make the glass blank G.

As illustrated in S1 of FIG. 6, the recess 180C formed by the blocks 181 and 182 receives the molten glass $L_G$ flowing out from the molten glass outflow port 111. As illustrated in S2 of FIG. 6, the blocks 181 and 182 are quickly moved onto the downstream side of the flow of the molten glass $L_G$ at predetermined timing. In this way, the molten glass $L_G$ is cut. Then, as illustrated in S3 of FIG. 6, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 6, during the fall of the gob $G_G$, the spherical gob $G_G$ is sandwiched between the first die 121 and the second die 122 to perform the press forming, thereby preparing the disk-shaped glass blank G.

Figure 7:
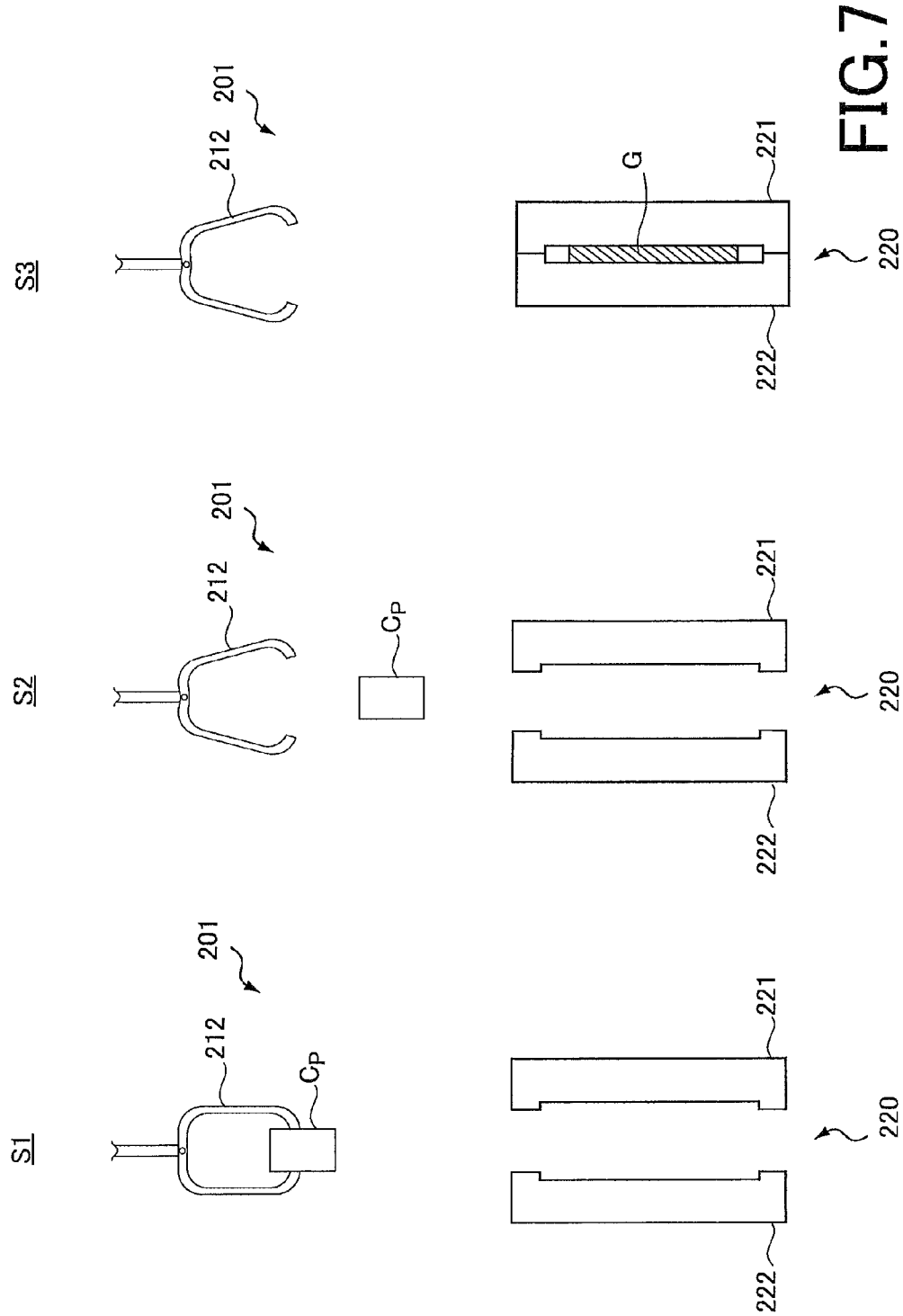
FIG. 7 is a view illustrating a modification of press forming of the embodiment using an optical glass heated by a softening furnace.

S1 of FIG. 7 to S3 of FIG. 7 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 7 is a view illustrating the state before the lump of the heated optical glass is formed, S2 of FIG. 7 is a view illustrating the state in which the lump of the optical glass falls down, and S3 of FIG. 7 is a view illustrating the state in which the press forming is performed to the lump of the optical glass to make the glass blank G.

As illustrated in S1 of FIG. 7, in an apparatus 201, a glass material grasping mechanism 212 conveys the lump $C_P$ of the optical glass to a position above a press unit 220. As illustrated in S2 of FIG. 7, the glass material grasping mechanism 212 releases the lump $C_P$ of the optical glass to cause the lump $C_P$ of the optical glass to fall down. As illustrated in S3 of FIG. 7, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 5, the descriptions are omitted.

[Modification of Press Forming Method]

A modification of the press forming method will be described with reference to FIG. 8.

Figure 8:
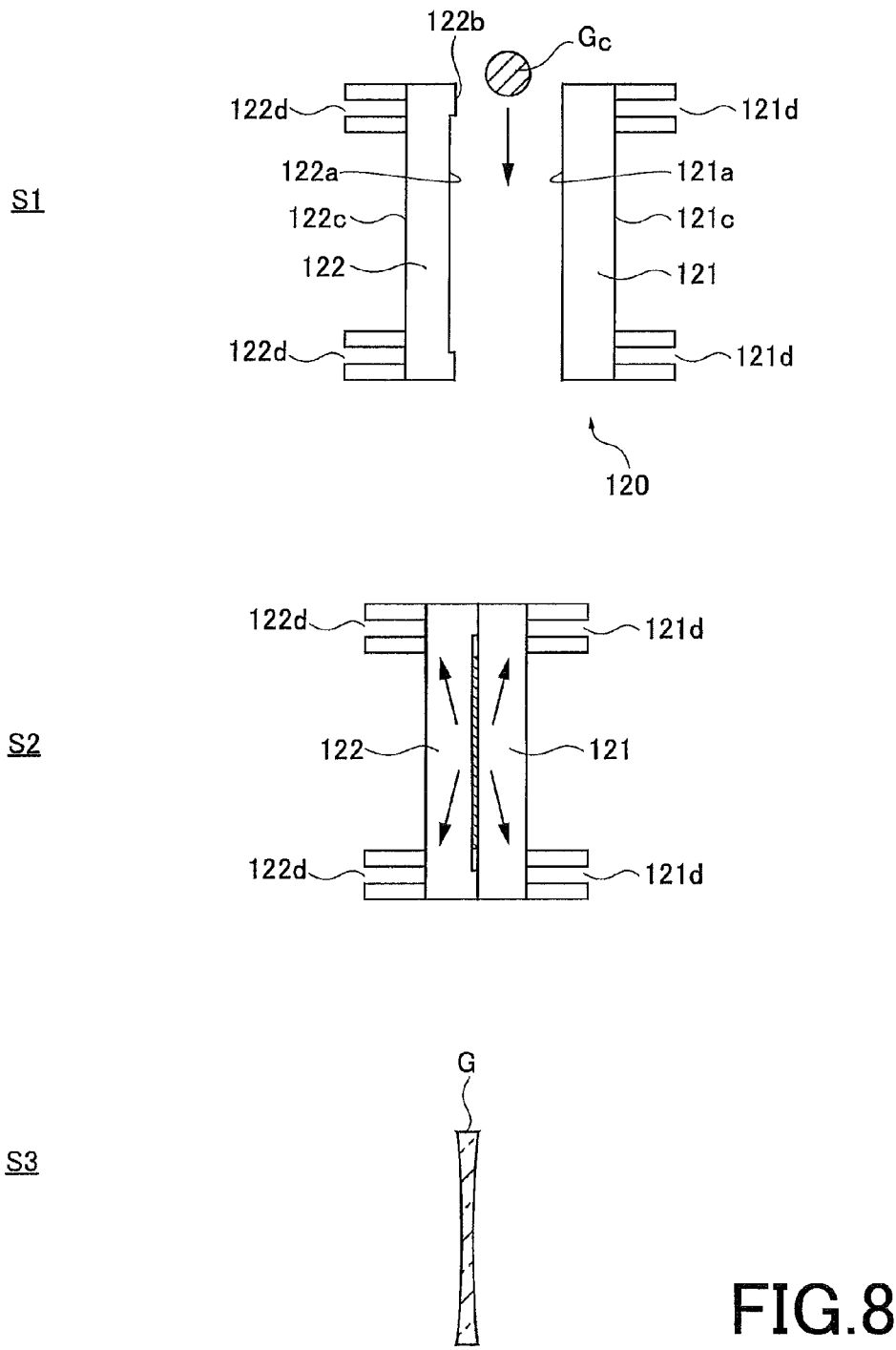
FIG. 8 is a view illustrating another modification of press forming of the embodiment.

In this modification, as illustrated in S1 of FIG. 8, heat sinks 121d and 122d are provided at the outer circumferential edges of outer circumferential surfaces 121c and 122c opposite, respectively, to the inner circumferential surface 121a and inner circumferential surface 122a as planar press forming surfaces, such that the heat sinks 121d and 122d surround the circumference of the disk-shaped glass blank, in the first die 121 and second die 122 illustrated in S1 to S3 of FIG. 4. Since the heat sinks 121d and 122d are provided in the first die 121 and the second die 122, a flow of heat as illustrated in S2 of FIG. 8 is generated in the first die 121 and the second die 122 during press forming, so that there is a difference in cooling between the portion of the outer circumference side and the central portion side of the glass blank during press forming. Consequently, the glass blank G after press forming is a concave-shaped glass blank, and thickness in cross-sectional shape of the glass blank G decreases as going from the outer circumference side toward the center side toward the center side as illustrated in S3 of FIG. 8. In this case, the flatness of the glass blank G can lead to target flatness intended for a glass substrate for magnetic disk, for example 4 μm or less. This is because when the glass blank G is press-formed, the temperature of the portions of the inner circumferential surface 121a and inner circumferential surface 122a on both sides of dies, which are in contact with the glass blank, is substantially the same between the inner circumferential surface 121a and the inner circumferential surface 122a over a period of time until the pressed glass blank G decreases to a strain point after press of dies is started.

The purpose of intentionally forming the concave-shaped glass blank is to efficiently perform grinding using a fixed abrasive grain as a subsequent process. That is, when flatness of a surface of a glass blank is good excessively, a fixed abrasive grain such as a diamond sheet slides smoothly on the surface of the glass blank, and grinding may therefore not be essentially performed. On the other hand, if the surface of the glass blank is made concave-shaped, at the time of grinding, the outer circumferential edge portion of the glass blank, which has a large thickness, is easily serves as a starting point of grinding processing using a fixed abrasive grain such as a diamond sheet. The machining allowance in grinding can be reduced to about a half of that of a glass blank having a uniform thickness. Further, the warp of a glass blank having a surface irregularity, the period of which is long as compared to the flatness, can be improved.

For the thickness of the glass blank G having a concave-shaped cross section as illustrated in S3 of FIG. 8, a difference between the maximum thickness and the minimum thickness is, for example, 8 μm. The thickness of the glass blank G can be measured using, for example, a micrometer.

(b) Scribing Process (Step S20)

Next, the scribing process will be described. After the press forming process, the formed glass blank G is subjected to scribing in the scribing process.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

A donut-shaped glass substrate can also be obtained by forming a circular hole in the glass blank using a core drill or the like.

(c) Shape Processing Process (Step S30)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process Using Fixed Abrasive Grain (Step S40)

In the grinding process using a fixed abrasive grain, the principal face of the glass substrate after the shape processing process is subjected to grinding processing (machining) using a double faces grinding apparatus including a planet gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having an extremely high flatness can be prepared, and therefore the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, the glass substrate after the grinding process is subjected to edge polishing.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and micro-waviness (MW-Rq) of 0.5 nm or less for the principal face of the glass substrate.

The micro-waviness may be represented by a RMS (Rq) value calculated as roughness at a wavelength bandwidth of 100 to 500 µm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 µm and no more than 200 µm. When as a result, the roughness is 0.03 µm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 µm×1 µm square can be used.

(g) Chemically Strengthening Process (Step S70)

Next, the glass substrate after the first polishing process is subjected to chemically strengthening treatment.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has preferably the machining allowance of about 1 µm, more specifically in a range of 0.5 to 2 µm. If the machining allowance is smaller than that range, surface roughness may not be sufficiently reduced. If the machining allowance is greater than that range, end shape may be deteriorated (roll-off etc.). Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pure water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have roughness (Ra) of 0.15 nm or less, more preferably 0.1 nm or less, and micro-waviness (MW-Rq) 0.3 nm or less, more preferably of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, a difference in temperature between a pair of dies, with which flatness required for the glass substrate for magnetic disk can be achieved, may be determined based on a correlation between a difference in temperature at a position where the pair of dies face each other at the time of press-forming the molten glass and flatness of the glass blank obtained after press forming, followed by performing press forming while the temperature of a pair of dies is controlled so that a difference in temperature between a pair of dies is no more than the determined difference in temperature. Therefore, the glass blank obtained in the press forming process of this embodiment does not require a process of machining the principal face because the surface roughness and flatness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and flatness higher than was previously possible.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

EXAMPLES

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from foam and an unmelted substance. Foam and an unmelted substance, deposition of crystals, and contaminants such as a refractory material and platinum forming the melting vessel were not observed in the glass obtained.

[Composition 1 of Glass]

Amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion expressed in mol %.

The above-described molten glass was provided, and a glass blank having a diameter of 75 mm and a thickness of 0.9 mm was prepared using a press forming method of the present invention (method using the apparatus in FIGS. 3 and 4). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.01 µm to 0.1 µm.

The molten glass material $L_G$ discharged from a molten glass outflow port 111 was cut by a cutting unit 160, so that a gob $G_G$ having a thickness of about 20 mm was formed. The gob $G_G$ was cooled while being pressed under a load of 3000 kgf by a press unit until the gob $G_G$ had a temperature equal to or lower than the glass transition temperature (Tg) of the molten glass material (about 10 seconds), so that a glass blank having a diameter of 75 mm was formed.

In this Example, the target flatness of the glass blank formed by the press forming process (flatness required for the glass blank) was 8 µm or less as one example. Here, the reason why the target flatness of the glass blank was 8 µm or less is that the target flatness of a magnetic disk, which is required for preventing contact of a head when the magnetic disk as a final product is mounted in a hard disk device, is considered to be 4 µm. Since the flatness is not changed before and after formation of a film on the glass substrate for magnetic disk, it can be ensured that the flatness of the magnetic disk is 4 µm or less if the flatness of the glass substrate for magnetic disk is 4 µm or less, but if the flatness of the glass blank formed in the press forming process is more than 8 µm, it is difficult to ensure that the flatness of the glass substrate after grinding process is 4 µm or less even when the grinding process as a subsequent process is performed. Thus, the target flatness of the glass blank was 8 µm or less. It is further preferred that the flatness of the glass blank formed in the press forming process is 4 µm or less because it can be ensured that the flatness of the magnetic disk is 4 µm or less even if the grinding process as a subsequent process is omitted.

In this Example, the flatness of the resulting glass blank was measured with the temperature of the second die being changed from 450 to 490° C. while the temperature of the first die was fixed at 470° C. in order to find out conditions for a difference in temperature between a pair of dies, which satisfies the target flatness of the glass blank. The reason why the minimum temperature of the die was set to 450° C. is that when the minimum temperature of the die is lower than 450° C., the glass may be broken during pressing.

[Measurement of Glass Blank Prepared in Example]

For the glass blank having a diameter of 75 mm, which had been prepared in Example, the flatness and the surface roughness (arithmetic mean roughness Ra) were measured.

The flatness can be defined as a difference in height between the lowest position and the highest position in the normal axis direction in the principal face of the disk-shaped glass blank. The flatness was measured using, for example, Flatness Tester FT-900 manufactured by NIDEK CO., LTD. Evaluation criteria for the flatness illustrated in Table 1 are as follows. It is preferred that the flatness of the glass blank is 8.0 µm or less in the following criteria because the flatness can be improved to a level of 4 µm or less, which is target flatness of the glass substrate for magnetic disk. It is preferred that the flatness of the glass blank is 4.0 µm or less because the target flatness of the glass substrate for magnetic disk can be achieved even if the grinding process is omitted, thereby leading to cost reduction.

Very good: The flatness is 2.0 µm or less.

Good: The flatness is more than 2.0 µm and no more than 4.0 µm.

Fair: The flatness is more than 4.0 µm and no more than 8.0 µm.

Poor: The flatness is more than 8.0 µm.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used. As a result, the surface roughness of the glass blank was 0.05 μm or less in all examples. This is because regardless of the temperature of the die, the inner circumferential surfaces of the first die and the second die are shape-transferred to the glass blank, so that the surface roughness of the glass blank is comparable to the surface roughness of the inner circumferential surfaces of the first die and the second die. When the arithmetical mean roughness Ra is 0.1 μm or less, target surface properties of the glass substrate for magnetic disk can be obtained by omitting the grinding process to the principal face and performing the polishing process directly.

In the press forming method of this embodiment, unlike the conventional direct press method, the glass gob is not seized to the die even when the surface roughness is reduced since press forming is completed within a extremely short period after molten glass starts to contact dies. Thus, the press forming method of this embodiment is preferable in that the surface roughness of the die can be reduced for obtaining a glass blank having a desired surface roughness.

TABLE 1

| | Difference in temperature between first die and second die(*) | Flatness | Evaluation of flatness |
|---|---|---|---|
| Sample 1 | +20° C. | 15.8 μm | Poor |
| Sample 2 | −20° C. | 16.1 μm | Poor |
| Sample 3 | +11° C. | 8.9 μm | Poor |
| Sample 4 | −11° C. | 8.8 μm | Poor |
| Sample 5 | +9° C. | 7.5 μm | Fair |
| Sample 6 | −9° C. | 7.0 μm | Fair |
| Sample 7 | +5° C. | 3.9 μm | Good |
| Sample 8 | +1° C. | 1.0 μm | Very good |

(*)The difference in temperature between the first die and the second die is a value obtained by subtracting the temperature of the first die (470° C. here) from the temperature of the second die.

Figure 9:
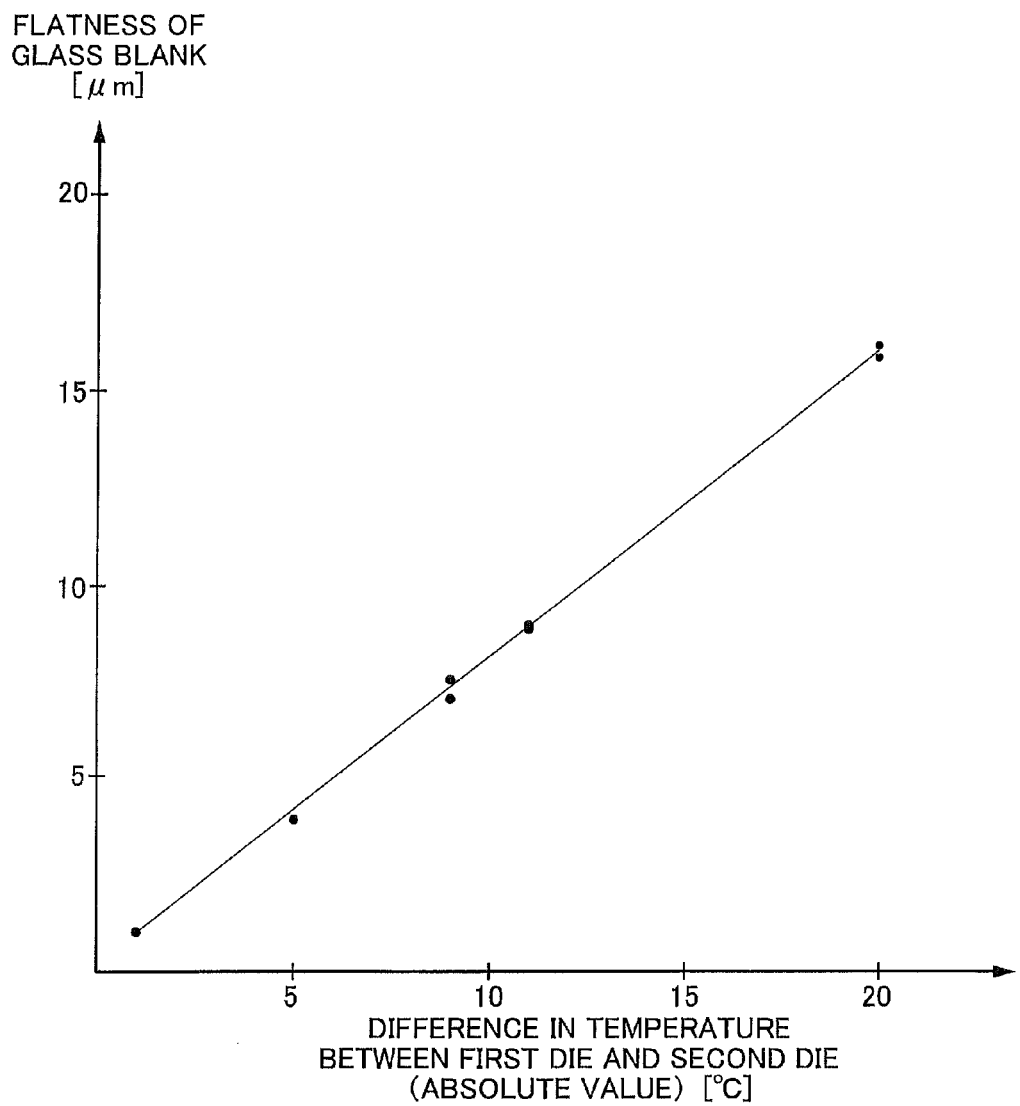
FIG. 9 is a view illustrating a correlation between a difference in temperature between a pair of dies and flatness of a glass blank in an Example.

From Table 1, it is apparent that there is a correlation between a difference in temperature between a pair of dies when the glass blank of each sample is press-formed and flatness of the glass blank of each sample. When the relationship between the difference in temperature and the flatness for each sample in Table 1 is plotted, there is an approximately proportional relationship between the former and the latter as illustrated in FIG. 9. That is, where the difference in temperature on the abscissa is X[° C.] and the flatness on the ordinate is Y[μm], the relationship of Y=0.8X holds on the whole. As is apparent from Table 1 and FIG. 9, particularly the highest flatness was achieved when the difference in temperature was 1° C. or less.

When referring to FIG. 9, it is apparent that the difference in temperature between the first die and the second die may be set at 10° C. or less for satisfying the target flatness of the glass blank (8 μm or less in this embodiment). The flatness of the glass blank may be set at 4 μm or less for omitting the grinding process after press forming as described above, and it is apparent that for achieving this flatness, the difference in temperature between the first die and the second die may be set at 5° C. or less.

Using glass having the other components (below Composition 2 and 3 of glass), the difference in temperature between the first die and the second die, and flatness of a glass blank were measured in like manner. It should be noted that a temperature of the was set to be 30° C. lower than Tg of each glass, and that a difference of temperature between the first die and the second die was set in the same way as described in Table 1. Resultantly, the same level of correlation as described in Table 1 was also obtained with regard to a difference of temperature between the dies and flatness of a glass blank.

[Composition 2 of Glass]

Amorphous aluminosilicate glass (Tg: 630° C.; $80\times10^{-7}$/K as average linear expansion coefficients of the glass at temperatures of 100° C. to 300° C.) having the following composition.

The glass substrate according to the present embodiment may be amorphous aluminosilicate glass having the following composition.

Glass material including, as a glass composition expressed in mol %, 56 to 75% of $SiO_2$,
1 to 11% of $Al_2O_3$,
more than 0% and 4% or less of $Li_2O$,
1% or more and less than 15% of $Na_2O$, and
0% or more and less than 3% of $K_2O$, and is substantially free of BaO;

a total content of alkali metal oxides selected from the group consisting of $Li_2°$, $Na_2O$, and $K_2O$ is in a range of 6 to 15%;

a molar ratio of a content of $Li_2O$ to a content of $Na_2O$ ($Li_2O/Na_2O$) is less than 0.50;

a molar ratio of a content of $K_2O$ to the total content of the alkali metal oxides $\{K_2O/(Li_2O+Na_2O+K_2O)\}$ is 0.13 or less;

a total content of alkaline-earth metal oxides selected from the group consisting of MgO, CaO, and SrO is in a range of 10 to 30%;

a total content of MgO and CaO is in a range of 10 to 30%;

a molar ratio of the total content of MgO and CaO to the total content of the alkaline-earth metal oxides $\{(MgO+CaO)/(MgO+CaO+SrO)\}$ is 0.86 or more;

a total content of the alkali metal oxides and the alkaline-earth metal oxides is in a range of 20 to 40%;

a molar ratio of a total content of MgO, CaO, and $Li_2O$ to the total content of the alkali metal oxides and the alkaline-earth metal oxides $\{(MgO+CaO+Li_2O)/(Li_2O+Na_2O+K_2O+MgO+CaO+SrO)\}$ is 0.50 or more;

a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

[Composition 3 of Glass]

Amorphous aluminosilicate glass (Tg: 680° C.; $80\times10^{-7}$/K as average linear expansion coefficients of the glass at temperatures of 100° C. to 300° C.) having the following composition.

Glass material including, as a glass composition expressed in mol %, 50 to 75% of $SiO_2$, 0 to 5% of $Al_2O_3$, 0 to 3% of $Li_2O$, 0 to 5% of ZnO, 3 to 15% in total of $Na_2O$ and $K_2O$, 14 to 35% in total of MgO, CaO, SrO, and BaO and 2 to 9% in total of $ZrO_2$, $TiO_2$, $La_2O_3$, $Y_2O_3$, $Yb_2O_3$, $Ta_2O_5$, $Nb_2O_5$ and $HfO_2$, a molar ratio [(MgO+CaO)/(MgO+CaO+SrO+BaO)] is in a range of 0.8 to 1, and a molar ratio [$Al_2O_3$/(MgO+CaO)] is in a range of 0 to 0.30.

[Preparation of Glass Substrate for Magnetic Disk in Example]

Using the glass blanks of samples 2, 4, 6 and 7 described above, glass substrates for magnetic disk were prepared, respectively, by performing all the processes except for the process of the step S40 illustrated in FIG. 2. That is, the glass substrate for magnetic disk was prepared without performing the process of grinding the principal face for improving the flatness. The prepared glass substrate for magnetic disk has a nominal 2.5 inch size (an inner diameter of 20 mm, an outer diameter of 65 mm and a thickness of 0.8 mm).

In preparation of the glass substrate for magnetic disk, the processes of first polishing and second polishing were performed under the following conditions.

First polishing process: polishing was performed using cerium oxide (average particle size: 1 to 2 μm in diameter) and a hard urethane pad. Machining allowance is 10 μm.

Second polishing process: polishing was performed using colloidal silica (average particle size: 0.03 μm in diameter) and a soft urethane pad. Machining allowance is 1 μm.

Next, recording layers were deposited on the glass substrates for magnetic disk, which had been prepared based on the glass blanks of samples 2, 4, 6 and 7, to prepare magnetic disks (samples 2A, 4A, 6A and 7A, respectively).

Deposition of recording layer on the glass substrate for magnetic disk was performed in the following manner. First, an adhesive layer, a soft magnetic layer, a pre-underlying layer, an underlying layer, a principal recording layer, and an auxiliary recording layer, a protective layer and a lubricant layer were sequentially deposited in Ar atmosphere by a DC magnetron sputtering method using an evacuated deposition apparatus. The Ar gas pressure at the time of deposition was 0.6 Pa unless otherwise specified. As the adhesive layer, Cr-50Ti was deposited in a thickness of 10 nm. As the soft magnetic layer, layers of 92Co-3Ta-5Zr were each deposited in a thickness of 20 nm with a Ru layer of 0.7 nm interposed therebetween. As the pre-underlying layer, Ni-5W was deposited in a thickness of 8 nm. As the underlying layer, Ru was deposited in a thickness of 10 nm at 0.6 Pa, and Ru was deposited thereon in a thickness of 10 nm at 5 Pa. As the principal recording layer, 90(72Co-10Cr-18Pt)-5($SiO_2$)-5 ($TiO_2$) was deposited in a thickness of 15 nm at 3 Pa. As the auxiliary recording layer, 62Co-18Cr-15Pt-5B was deposited in a thickness of 6 nm. As the protective layer, a layer was deposited in a thickness of 4 nm using $C_2H_4$ by a CVD method, and the surface layer was subjected to nitriding treatment. As the lubricant layer, a layer was formed in a thickness of 1 nm using PFPE by a dip coating method.

[Evaluation of Magnetic Disk of Examples]

For the magnetic disks of samples 2A, 4A, 6A and 7A, a touch-down test (DFH touch-down test) of a DFH (Dynamic Fly height) head element portion was conducted using a HDF tester (Head/Disk Flyability Tester) manufactured by Kubota Comps Corporation. In this test, the element portion is gradually protruded by a DFH mechanism, and contact thereof with the surface of magnetic disk is detected with an AE (Acoustic Emission) sensor to thereby evaluate a protrusion amount when the head element portion comes into contact with the surface of the magnetic disk. As the head, a DFH head for 320 GB/P magnetic disks (2.5 inch size) was used. A flying height when the element portion is not protruded is 10 nm. That is, for example, the head flying height is 2 nm when the protrusion amount is 8 nm. Other conditions were set as described below.

Evaluation radius: 22 mm
Rotation number of magnetic disk: 5400 rμm
Temperature: 25° C.
Humidity: 60%

Results of the DFH touch-down test are illustrated in Table 2. In Table 2, evaluations were made as described below according to the protrusion amount of the head element portion.

Good: Protrusion amount ≥8 nm
Poor: Protrusion amount <8 nm

TABLE 2

|  | Evaluation of protrusion amount |
|---|---|
| Sample 2A | Poor |
| Sample 4A | Poor |
| Sample 6A | Poor |
| Sample 7A | Good |

Protrusion amount for each of the samples 6A, 7A was 7 nm or greater, while protrusion amount for each of the samples 2A, 4A was less than 7 nm. The glass blank of the sample 7, which is a basis of the sample 7A, has flatness of 4.0 μm or less that is target flatness of the glass substrate for magnetic disk, as illustrated in Table 1. Accordingly, the sample 7A, which is a magnetic disk prepared based on the glass blank of the sample 7 without passing through the grinding process, also has flatness of 4.0 μm or less. As a result, the protrusion amount of the DFH head could be sufficiently increased even though the grinding process was omitted for the sample 7A. That is, for the sample 7A, it could be confirmed that a glass substrate for magnetic disk, which has good flatness and surface roughness and allows a good DFH touch test result to be obtained when the glass substrate is formed into a medium, can be manufactured even though the grinding process is omitted.

Second Embodiment

In the present embodiment, processes other than a press forming process in a method for manufacturing a glass blank for magnetic disk are the same as that in the first embodiment, and are therefore omitted for the sake of brevity.

[Thermally Equalizing Treatment of Die]

Figure 10:
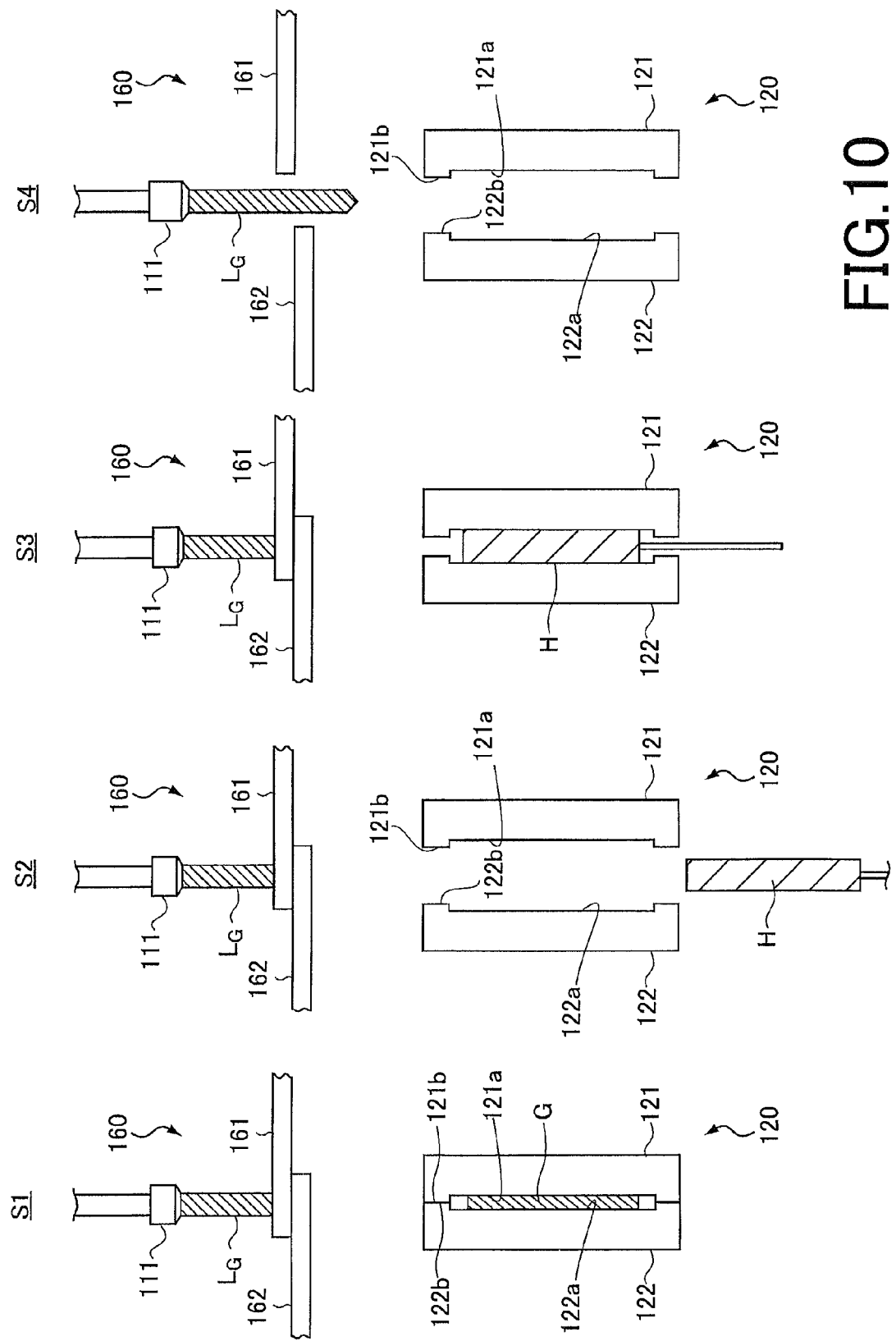
FIG. 10 is a view for explaining thermally equalizing treatment of dies in press forming of the second embodiment.
Figure 11:
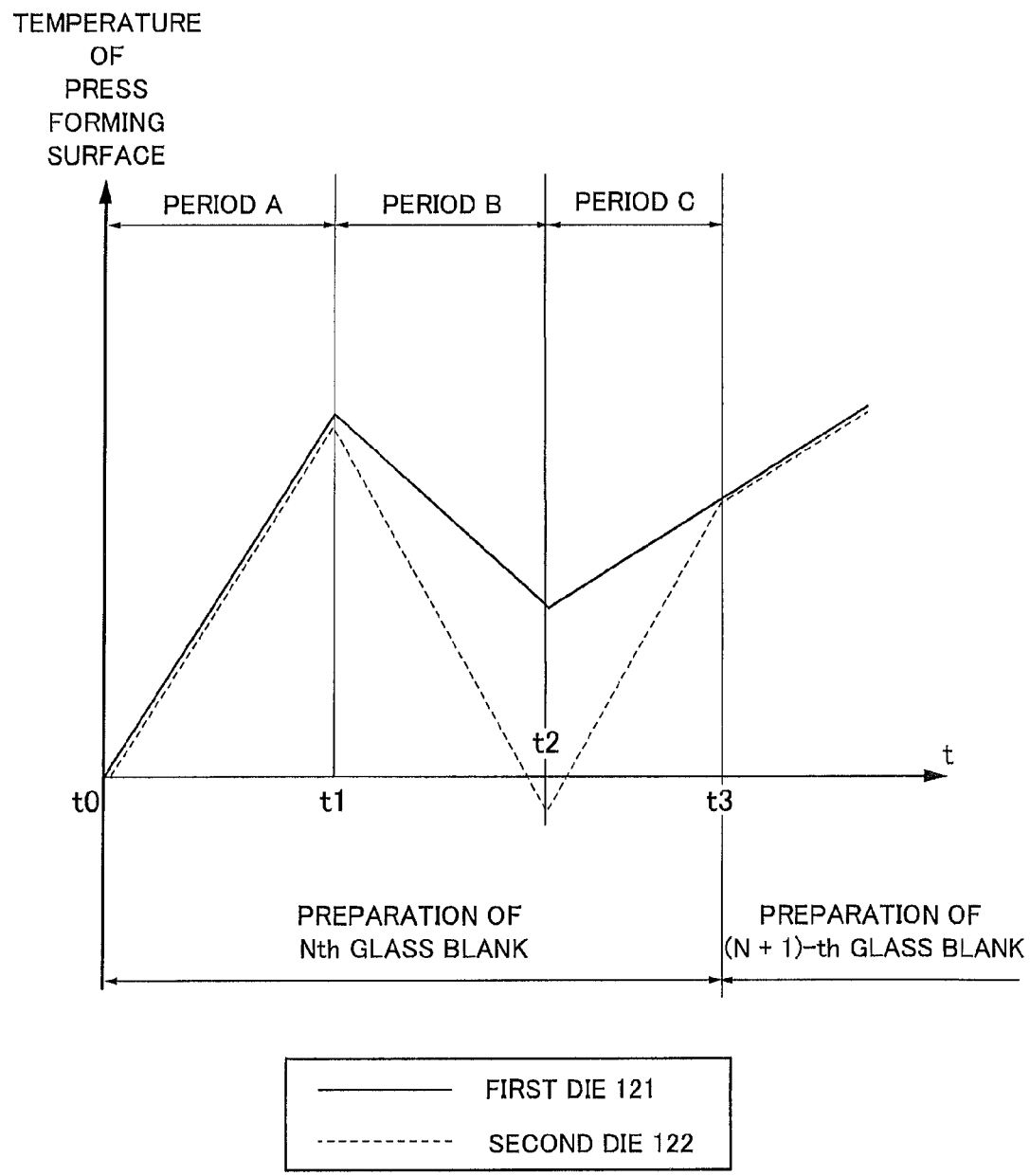
FIG. 11 is a view illustrating a change in temperature of the press forming surface of each of a pair of dies before and after the thermally equalizing treatment of the dies according to the second embodiment.
Figure 12:
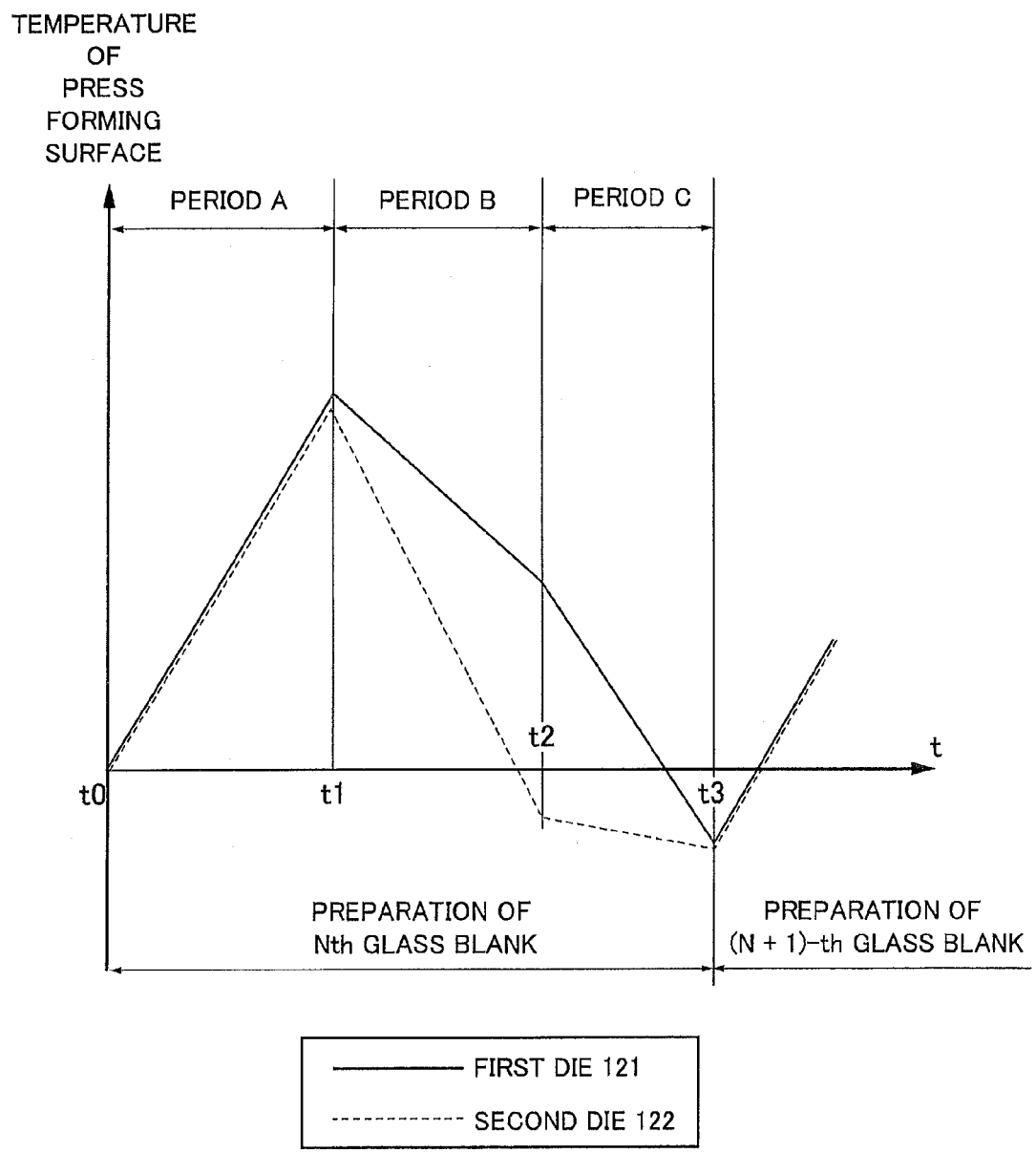
FIG. 12 is a view illustrating a change in temperature of the press forming surface of each of a pair of dies before and after the thermally equalizing treatment of the dies according to the second embodiment.

In the press forming process of this embodiment, thermally equalizing treatment (thermally equalizing process) of the die is performed at timing between press forming of a gob $G_G$ and press forming of the next gob $G_G$ when the molten glass material $L_G$ is continuously cut to cause the gob $G_G$ to fall down, so that the glass blank G is prepared. The thermally equalizing treatment of the die will be described with reference to FIGS. 10 to 12. FIG. 10 is a view for explaining thermally equalizing treatment of dies in press forming of this embodiment. FIGS. 11 and 12 are views each illustrating a change in temperature of the press forming surface of each of a pair of dies before and after the thermally equalizing treatment of the dies.

S1 of FIG. 10 to S4 of FIG. 10 illustrate treatment including press forming of the gob $G_G$ illustrated in FIG. 4 and press forming of the next gob $G_G$. S1 of FIG. 10 is identical to S3 of FIG. 4. Dies are closed after the glass blank G is formed by pressing the gob in S1 of FIG. 10, and the formed glass blank G vertically falls down (not illustrated in FIG. 10). Thereafter, as illustrated in S2 of FIG. 10, a thermally equalizing material H set at a predetermined temperature is inserted between the first die 121 and the second die 122, for example, from the lower side. Further, as illustrated in S3 of FIG. 10, the dies are closed with the thermally equalizing material H inserted in the dies, whereby both surfaces of the thermally equalizing material H are brought into surface contact with the inner circumferential surface 121a of the first die 121 and the inner circumferential surface 122a of the second die 122. The surface contact may be performed at the whole of the inner circumferential surface (press forming surface) of the die as illustrated in S3 of FIG. 10, but it suffices that the surface contact is performed at least at a portion of the inner circumferential surface which contacts the gob. Due to the surface contact, the inner circumferential surfaces of a pair of dies each have a temperature identical or close to the temperature of the thermally equalizing material H. The surface contact is continued until the molten glass is cut to cause a new gob to fall down for press forming as illustrated in S4 of FIG. 10. A time during which the dies and the thermally equalizing material H contact each other is, for example, 1 second or more. In the event of S4 of FIG. 10, the dies are opened again to cause the thermally equalizing material H to retreat to the lower side.

As described above, the thermally equalizing material is used for the purpose of reducing, or more preferably eliminating a difference in temperature between the first die 121 and the second die 122 during a time period between press forming of a gob and press forming of the next gob when gobs are continuously press-formed. The thermally equalizing material is preferably formed of a material having a high heat conductivity, such as, for example, copper, a copper alloy, aluminum or an aluminum alloy, and has a shape which allows the thermally equalizing material to come into surface contact with the inner circumferential surface 121a of the first die 121 and the inner circumferential surface 122a of the second die 122 at an equal pressure. When the thermally equalizing material is formed of a material having high heat conductivity, the whole of the thermally equalizing material is easily set at a uniform temperature, so that the temperatures of the first die 121 and the second die 122 are easily equalized.

The temperature of the thermally equalizing material is preferably between the upper limit and the lower limit of the temperature of a portion which contacts the gob when it is assumed that press forming is performed without bringing the thermally equalizing material into contact with the die. When the temperature of the thermally equalizing material is in the above-described range, a difference in temperature at the time point when the die and the thermally equalizing material start to come into contact with each other is small, so that a difference in temperature between the first die 121 and the second die 122 can be made close to zero in a short time.

FIG. 11 illustrates a change in temperature (change in temperature associated with the thermally equalizing treatment of the die) of the press forming surface of each of a pair of dies when the temperature of the die is higher than the temperature of the thermally equalizing material at the time point when the die and the thermally equalizing material start to come into contact with each other.

In FIG. 11, time t0 represents a time point when the pressing of the gob is started when the Nth glass blank is prepared. In FIG. 11, it is assumed that the temperatures of the first die 121 and the second die 122 are identical at time t0. During a period A of time t0 to t1, a high-heat gob comes into contact with both the dies, and heat is transferred equally to both the dies from the gob, so that the temperatures of both the dies rise at identical gradients. The glass blank is taken out from the die at around time t1.

During a period B of time t1 to time t2, the press forming surface of the die is gradually cooled by outside air, so that the temperature decreases, with the temperature at time t2 being a peak. At this time, for example, even if the peak temperatures of a pair of dies are identical at time t2, their temperature decrease gradients may be different. For example, this occurs in the case where the glass blank remains stuck to one of dies when the dies are opened after the glass blank is formed. At this time, when air is discharged from the interior of the die toward the press forming surface, and the glass blank is detached from the die by means of the discharge force, the temperature decrease gradients of the dies in the period B are different if the discharge of air is performed for both the dies. This is because the degree of cooling of the die by discharge of air varies between the die to which the glass blank is stuck and the die to which the glass blank is not stuck.

In this embodiment, for example, the thermally equalizing material is inserted into dies at time t2, and the thermally equalizing material is brought into contact with a pair of dies during a period C of time t2 to t3. Consequently, the temperatures of the first die 121 and the second die 122 rise to a temperature identical to that of the thermally equalizing material at time t3. At time t3, falling and pressing of a gob are started for preparation of the next (N+1)-th glass blank. At time t3, a difference in temperature between the dies is zero, and therefore the (N+1)-th glass blank has a good flatness.

FIG. 12 illustrates a change in temperature (change in temperature associated with the thermally equalizing treatment of the die) of the press forming surface of each of a pair of dies when the temperature of the die is lower than the temperature of the thermally equalizing material at the time point when the die and the thermally equalizing material start to come into contact with each other. In FIG. 12, unlike FIG. 11, the temperatures of the first die 121 and the second die 122 decreases to a temperature identical to that of the thermally equalizing material at time t3. Since it suffices that a difference in temperature between dies is reduced or eliminated before press forming of the next gob, the temperatures of a pair of dies may be elevated or may be decreased by the thermally equalizing material as illustrated in FIGS. 11 and 12.

As described in the first embodiment, there is a correlation between a difference in temperature at a position where a pair of dies face each other at the time of press-forming the gob $G_G$, and a flatness of the glass blank obtained after press forming. In the present embodiment, thermally equalizing treatment of die is performed so that the difference in temperature of the dies is reduce or eliminated at a early period of press forming consecutively performed. Therefore, when manufacturing glass blanks consecutively, it becomes possible to achieve good flatness for glass blanks.

Third Embodiment

In the present embodiment, processes other than a press forming process in a method for manufacturing a glass blank for magnetic disk are the same as that in the first embodiment, and are therefore omitted for the sake of brevity. Unlike the first embodiment, the press forming process in a method for manufacturing a glass blank for magnetic disk according to the present embodiment has a detachment process.

In the detachment process, treatment is performed for ensuring that the glass blank G falls down without being attached to any of the inner circumferential surface 121a of the first die 121 and the inner circumferential surface 122a of the second die 122 after press forming. The treatment in the detachment process will be described with reference to FIG. 13. FIG. 13 is a view illustrating treatment in the detachment process where a method is used in which a gas is supplied to a space formed by closing of the die.

In the detachment process, at least a part of the outer circumferential portion of the glass blank G is locally cooled while both the dies (first die 121 and second die 122) and the glass blank G are in contact with each other, so that the glass blank G is easily detached from the die. This is considered to be because the outer circumferential end portion of the glass blank G is cooled and thereby shrunk, and slightly turned up from the inner circumferential surface, and consequently when the die is opened, air easily enters a gap between the glass blank G and the die, so that the glass blank is easily detached.

Specific examples of the method for cooling at least a part of the outer circumferential portion of the glass blank D while the both the dies and the glass blank G are in contact with each other include a method in which a gas (e.g. air) is supplied to a space S formed by closing of the dies. That is, a gas (e.g. air) is supplied to the space S formed by closing of the dies for cooling the glass blank G immediately before or concurrently with timing at which the first die 121 and the second die 122 in a closed state (e.g. closed state illustrated in S3 of FIG. 4) start to open. The temperature of the gas supplied may be a temperature for locally cooling the glass blank G at the time of press forming, and is, for example, room temperature. FIG. 13 illustrates two aspects E1 and E2 as an aspect of supplying the gas. In the aspect illustrated in E1 of FIG. 13, the gas is introduced (supplied) into the space S in parallel to the inner circumferential surfaces 121a and 122a of the dies. Consequently, the glass blank G is locally cooled and thereby thermally shrunk, and immediately thereafter or concurrently therewith, the dies are opened, so that the glass blank falls down in a vertical direction without being attached to any of the inner circumferential surface 121a of the first die 121 and the inner circumferential surface 122a of the second die 122.

E1 of FIG. 13 illustrates one example in which the gas is introduced into the space from two locations in each die through a passage provided in each die, but the present invention is not limited thereto. Since the space S is formed in a donut shape along the circumference of the glass blank S, the gas can be introduced into the space S from an arbitrary place on the circumference of the die.

The gas is introduced into the space S at timing immediately before or concurrent with timing at which the dies in a closed state start to open as described above, but the phrase "immediately before" refers to timing about 10 to 1000 ms before the timing at which the dies start to open.

On the other hand, in the aspect illustrated in E2 of FIG. 13, the gas is introduced into the space S perpendicularly to the inner circumferential surfaces 121a and 122a (i.e. in the press direction) through the passage provided in each die. Even in this introduction aspect, the gas introduced in opposite directions causes convention currents in the space S, so that a stream of gas toward the glass blank G is generated, and therefore the glass blank G is locally cooled and thereby thermally shrunk. Accordingly, at the same time of closing of the dies, the glass blank falls down in a vertical direction without being attached to any of the inner circumferential surface 121a of the first die 121 and the inner circumferential surface 122a of the second die 122 as in the case of E1 of FIG. 13.

In the treatment in the detachment process illustrated in FIG. 13, preferably the gas is introduced at positions symmetrical with respect to each of a pair of dies, and there is no difference in rate and pressure of the introduced gas between a pair of dies. The structure of the passage (path, passage diameter, etc.) for supply of a gas, which is provided in each of a pair of dies, is preferably symmetrical between dies. Consequently, it can be ensured there is no influence on a difference in temperature between dies by introduction of the gas over a period of time until the dies are opened after the glass blank G is formed. Accordingly, a situation can be avoided in which as the detachment step is performed, a difference in temperature between dies is increased to deteriorate the flatness of the glass blank G.

As described above, the glass blank G obtained in the forming step has a good level of surface roughness by keeping the surface roughness (Ra) of the inner circumferential surface 121a and the inner circumferential surface 122a of the dies at 0.1 μm or less. So far, the glass blank G has been easily attached to the inner circumferential surface of the die after formation when the glass blank is formed using dies having inner circumferential surfaces having such a small surface roughness. In this embodiment, however, the glass blank can be caused to fall down without being attached to the inner circumferential surface of any of the dies owing to the detachment process described above. That is, owing to the detachment process, both the advantage that the surface roughness of the glass blank G is decreased and the advantage that the glass blank is not attached to the die after formation can be achieved. That is, the detachment process can be suitably used particularly in manufacture of a glass blank required to have small surface roughness.

As described in the first embodiment, there is a correlation between a difference in temperature at a position where a pair of dies face each other at the time of press-forming the gob $G_G$, and a flatness of the glass blank obtained after press forming. In the present embodiment, detachment process is performed so that attachment of a glass blank to either die is prevented after the press forming. Further, due to the detachment process, a difference in temperature between the pair of dies is suppressed. Therefore, when manufacturing glass blanks consecutively, it becomes possible to prevent deterioration of flatness of glass blanks.

The embodiments of the present invention have been described in detail, but the method for manufacturing a glass blank for magnetic disk, the method for manufacturing a glass substrate for magnetic disk, and the glass blank for magnetic disk according to the present invention are not limited to the aforementioned embodiments, and it is needless to say that various modifications and changes may be made without departing from the spirit of the present invention.

What is claimed is:

1. A method for manufacturing a glass blank for magnetic disk, the method including a forming process of press-forming a lump of molten glass using a pair of dies, the method comprising:

press-forming a lump of molten glass while falling from a direction orthogonal to the falling direction using a pair of dies;

obtaining a correlation between a difference in temperature of a pair of dies in the press-forming the molten glass and flatness of the glass blank obtained after press forming, the difference being measured at positions of the pair of dies facing each other;

determining a difference in temperature of the pair of dies based on the correlation, the difference corresponding to a target flatness of the glass blank; and performing the forming process so that a difference in temperature of the pair of dies is within the determined difference in temperature.

2. The method for manufacturing a glass blank for magnetic disk according to claim 1, wherein the target flatness is equal to flatness of a magnetic disk, the flatness of the magnetic disk being determined to prevent a head from touching the magnetic disk when the magnetic disk is mounted in a hard disk device.

3. The method for manufacturing a glass blank for magnetic disk according to claim 1, wherein in the forming process, press forming is performed so that the temperature of portions of the pair of dies, which contact the molten glass, is substantially the same.

4. The method for manufacturing a glass blank for magnetic disk according to claim 1, wherein the temperature of the pair of dies is kept lower than a glass transition point (Tg) of the molten glass during a period of time until the glass blank is separated from the die after beginning to contact the die.

5. The method for manufacturing a glass blank for magnetic disk according to claim 1, wherein in the forming process, press forming is performed without attaching a mold release material to the die.

6. The method for manufacturing a glass blank for magnetic disk according to claim 1, wherein a thermal expansion coefficient at 100° C. to 300° C. of the glass blank obtained after press forming is in a range of $30 \times 10^{-7}$ to $100 \times 10^{-7}$ ($K^{-1}$).

7. The method for manufacturing a glass blank for magnetic disk according to claim 1, wherein in the forming process, the lump of molten glass is press-formed so that flatness of the glass blank is 8 μm or less.

8. A method for manufacturing a glass substrate for magnetic disk, including a polishing process for polishing a glass blank with a machining allowance of 50 μm or less to manufacture a glass substrate for magnetic disk, the glass blank being manufactured with the method for manufacturing a glass blank for magnetic disk according to claim 1.

9. A method for manufacturing a glass substrate for magnetic disk, wherein a glass substrate for magnetic disk is manufactured using a glass blank for magnetic disk, the glass blank being obtained with the method for manufacturing a glass blank for magnetic disk according to claim 1.

10. A method for manufacturing a glass blank for magnetic disk, the method including a forming process of forming a plate-shaped glass blank by press-forming a falling molten glass in a direction orthogonal to the falling direction using a pair of dies while the molten glass is falling, wherein the forming process comprises a thermally equalizing process for reducing a difference in temperature of the pair of dies during a period of time until a new molten glass is press-formed after the dies are opened.

11. The method for manufacturing a glass blank for magnetic disk according to claim 10, wherein the thermally equalizing process is a process of bringing a thermally equalizing material into contact with at least one of the pair of dies.

12. The method for manufacturing a glass blank for magnetic disk according to claim 10, wherein in the forming process, press forming is performed so that the temperature of portions of the pair of dies, which contact the molten glass, is substantially the same.

13. The method for manufacturing a glass blank for magnetic disk according to claim 10, wherein the temperature of the pair of dies is kept lower than a glass transition point (Tg) of the molten glass during a period of time until the glass blank is separated from the die after beginning to contact the die.

14. The method for manufacturing a glass blank for magnetic disk according to claim 10, wherein in the forming process, press forming is performed without attaching a mold release material to the die.

15. A method for manufacturing a glass substrate for magnetic disk, including a polishing process for polishing a glass blank with a machining allowance of 50 μm or less to manufacture a glass substrate for magnetic disk, the glass blank being manufactured with the method for manufacturing a glass blank for magnetic disk according to claim 10.

16. A method for manufacturing a glass substrate for magnetic disk, wherein a glass substrate for magnetic disk is manufactured using a glass blank for magnetic disk, the glass blank being obtained by the method for manufacturing a glass blank for magnetic disk according to claim 10.

17. A method for manufacturing a glass blank for magnetic disk, the method comprising:
performing a forming process of forming a plate-shaped glass blank by press-forming a falling molten glass in a direction orthogonal to the falling direction using a pair of dies while the molten glass is falling;
performing, after the forming process, a detachment process of detaching from the die the glass blank attached to the die is performed without causing a difference in temperature of the pair of dies; and
performing, after the detaching process, the forming process by press-forming the next molten glass.

18. The method for manufacturing a glass blank for magnetic disk according to claim 17, wherein in the detachment process, at least a part of the outer circumferential portion of the glass blank is cooled while both the dies and the glass blank are in contact with each other.

19. The method for manufacturing a glass blank for magnetic disk according to claim 18, wherein in the detachment process, at least a part of the outer circumferential edge portion of the glass blank is cooled by supplying a gas to the glass blank.

20. The method for manufacturing a glass blank for magnetic disk according to claim 19, wherein the gas is supplied immediately before or concurrent with time at which the pair of dies having been closed starts to open.

21. The method for manufacturing a glass blank for magnetic disk according to claim 17, wherein in the forming process, press forming is performed so that the temperature of portions of the pair of dies, which contact the molten glass, is substantially the same.

22. The method for manufacturing a glass blank for magnetic disk according to claim 17, wherein the temperature of the pair of dies is kept lower than a glass transition point (Tg) of the molten glass during a period of time until the glass blank is separated from the die after beginning to contact the die.

23. The method for manufacturing a glass blank for magnetic disk according to claim 17, wherein in the forming process, press forming is performed without attaching a mold release material to the die.

24. The method for manufacturing a glass blank for magnetic disk according to claim 17, wherein surface roughness (Ra) of each of the pair of dies is 0.1 μm or less.

25. A method for manufacturing a glass substrate for magnetic disk, including a polishing process for polishing a glass blank with a machining allowance of 50 μm or less to manufacture a glass substrate for magnetic disk, the glass blank being manufactured with the method for manufacturing a glass blank for magnetic disk according to claim 17.

26. A method for manufacturing a glass substrate for magnetic disk, wherein a glass substrate for magnetic disk is manufactured using a glass blank for magnetic disk, the glass blank being obtained by the method for manufacturing a glass blank for magnetic disk according to claim 17.

27. A method for manufacturing a glass blank for magnetic disk, the method comprising a forming process of press-forming a lump of molten glass using a pair of dies, wherein in the forming process, the lump of molten glass is press-formed while falling from a direction orthogonal to the falling direction using a pair of dies so that a difference in temperature of the pair of dies is 10° C. or less, the difference being measured at positions of the pair of dies facing each other.

28. A method for manufacturing a glass blank for magnetic disk, the method comprising a forming process of press-forming a lump of molten glass while falling from a direction orthogonal to the falling direction using a pair of dies, wherein in the forming process, the lump of molten glass is press-formed so that flatness of the glass blank is 8 μm or less.

29. A method for manufacturing a glass blank for magnetic disk, the method comprising a forming process of forming a plate-shaped glass blank by press-forming a falling molten glass in a direction orthogonal to the falling direction using a pair of dies while the molten glass is falling, wherein each of the pair of dies includes a passage for introducing a gas to a space formed by closing of the pair of dies, and in the forming process, the gas is supplied to the space through the passage of each die while the pair of dies are closed.

* * * * *